United States Patent
Singh et al.

(10) Patent No.: US 8,644,603 B2
(45) Date of Patent: Feb. 4, 2014

(54) METHODS AND SYSTEM FOR SPECTRAL IMAGE SAMPLING

(76) Inventors: Tripurari Singh, Seattle, WA (US);
Mritunjay Singh, Irvine, CA (US)

( * ) Notice: Subject to any disclaimer, the term of this patent is extended or adjusted under 35 U.S.C. 154(b) by 116 days.

(21) Appl. No.: 13/153,367

(22) Filed: Jun. 3, 2011

(65) Prior Publication Data

US 2011/0299768 A1    Dec. 8, 2011

Related U.S. Application Data

(60) Provisional application No. 61/350,919, filed on Jun. 3, 2010.

(51) Int. Cl.
*G06K 9/00* (2006.01)

(52) U.S. Cl.
USPC .......................................................... 382/162

(58) Field of Classification Search
USPC ........... 382/162, 312; 348/270–280; 358/500, 358/512; 250/208.1
See application file for complete search history.

(56) References Cited

U.S. PATENT DOCUMENTS

| | | | |
|---|---|---|---|
| 3,971,065 A | 7/1976 | Bayer | |
| 7,688,368 B2 * | 3/2010 | Kijima et al. | 348/272 |
| 7,768,569 B2 * | 8/2010 | Kozlowski | 348/340 |
| 7,769,229 B2 * | 8/2010 | O'Brien et al. | 382/167 |
| 7,781,716 B2 * | 8/2010 | Anderson et al. | 250/208.1 |
| 7,907,791 B2 * | 3/2011 | Kinrot et al. | 382/276 |
| 8,139,130 B2 * | 3/2012 | Compton et al. | 348/277 |
| 2007/0206103 A1 | 9/2007 | Coifman et al. | |
| 2008/0095466 A1 | 4/2008 | Kinrot et al. | |
| 2010/0085452 A1 * | 4/2010 | Hirakawa et al. | 348/273 |
| 2010/0104178 A1 | 4/2010 | Tamburrino et al. | |

OTHER PUBLICATIONS

International Search Report and Written Opinion for Patent Cooperation Treaty Application No. PCT/US11/39191 (which has a common priority claim with U.S. Appl. No. 13/153,367), International Bureau of WIPO, pp. 1-8, dated Oct. 13, 2011.
K. Hirakawa and P.J. Wolfe, "Spatio-spectral color filter array design for enhanced image fidelity" in Proc. of IEEE ICIP, pp. II: 81-84, 2007.
L. Condat, "A New Class of Color Filter Arrays with Optimal Sensing Properties", Research Report HAL-00347433, Dec. 2008.
D. Alleysson, S. Susstrunk, and J. Herault, "Color demosaicing by estimating luminance and opponent chromatic signals in the Fourier domain", Proc. IS&T/SID 10th Color Imaging Conf, pp. 331-336, 2002.
E. Dubois, "Frequency-domain methods for demosaicking of bayer-sampled color images", IEEE Signal Processing Letters, 12(12):847-850, 2005.

(Continued)

*Primary Examiner* — Jose Couso
(74) *Attorney, Agent, or Firm* — Westberg Law Offices

(57) ABSTRACT

The present invention relates to spectral image sampling. An image is projected onto an array of optical transformation devices. Image intensity values transmitted by said array of optical transformation devices are detected at each sensor element of an image sensor. The image sensor comprises a plurality of photosensitive sensor elements configured to detect a magnitude of incident light, wherein said sensor elements are shaped as regular polygons whose aspect ratio is controlled to minimize sensor element count while obtaining a desired image quality. The detected image intensity values are processed to infer the image.

23 Claims, 21 Drawing Sheets

(56) References Cited

OTHER PUBLICATIONS

N. Lian, L. Chang, and Y.P. Tan, "Improved color filter array demosaicking by accurate luminance estimation" in IEEE International Conference on Image Processing, 2005, ICIP 2005, vol. 1, 2005.

D. Alleysson, S. Susstrunk, and J. Herault, "Linear demosaicing inspired by the human visual system", IEEE Transactions on Image Processing, 14(4):439-449, 2005.

Y. Hel-Or, "The canonical correlations of color images and their use for demosaicing", HP Laboratories Israel, Tech. Rep. HPL-2003-164R1, Feb. 2004.

Ron Kimmel, "Demosaicing: Image reconstruction from color ccd samples", IEEE Trans. Image Processing, 8:1221-1228, 1999.

E. Chang, S. Cheung, and D.Y. Pan, "Color filter array recovery using a threshold-based variable number of gradients", in Proceedings of SPIE, vol. 3650, p. 36, 1999.

K. Hirakawa and TW Parks, "Adaptive homogeneity-directed demosaicing algorithm", IEEE Transactions on Image Processing, 14(3):360-369, 2005.

ITU-R, "Recommendation BT.601-6: Studio encoding parameters of digital television for standard 4:3 and wide screen 16:9 aspect ratios", 2007.

D.L. Ruderman and W. Bialek, "Statistics of natural images: Scaling in the woods", Physics Review Letters 73 (1994), No. 6, 814-817.

Gunturk, B. K., Altunbasak, Y., and Mersereau, R. M., "Color plane interpolation using alternating projections," IEEE Trans. Image Processing 11, 997-1013 (2002).

Grass Valley Viper camera brochure, http://www.grassvalley.com/docs/Brochures/cameras/viper/viper_br.pdf (2002). Grass Valley can be reached at 400 Providence Mine Road, Nevada City, CA 95959.

M. Kowalczyk, "Spectral and imaging properties of uniform diffusers", J. Opt. Soc. Am. A 1, 192-200 (1984).

* cited by examiner

(-pi, pi) (pi, pi)
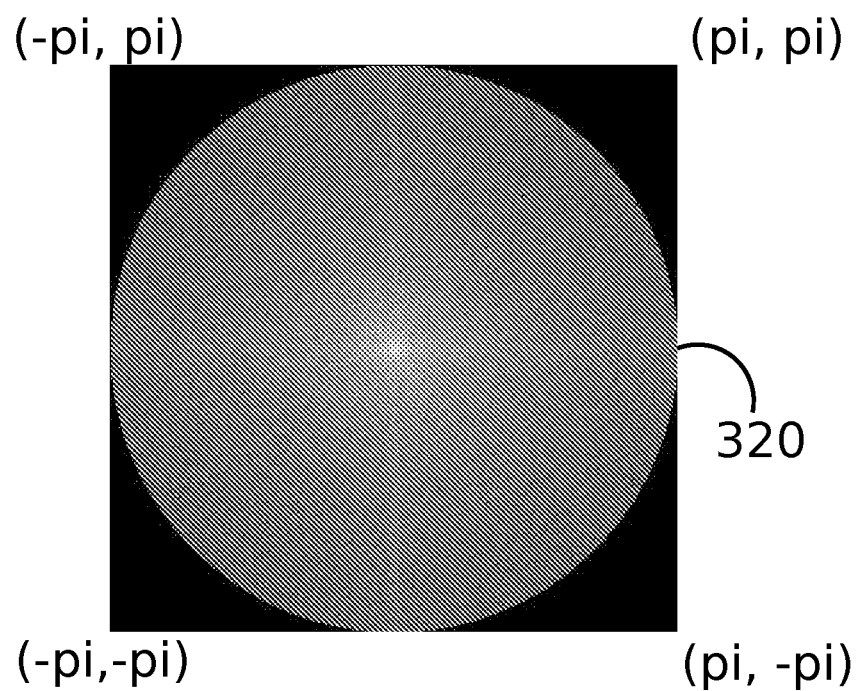
(-pi,-pi) (pi, -pi)
FIG. 3

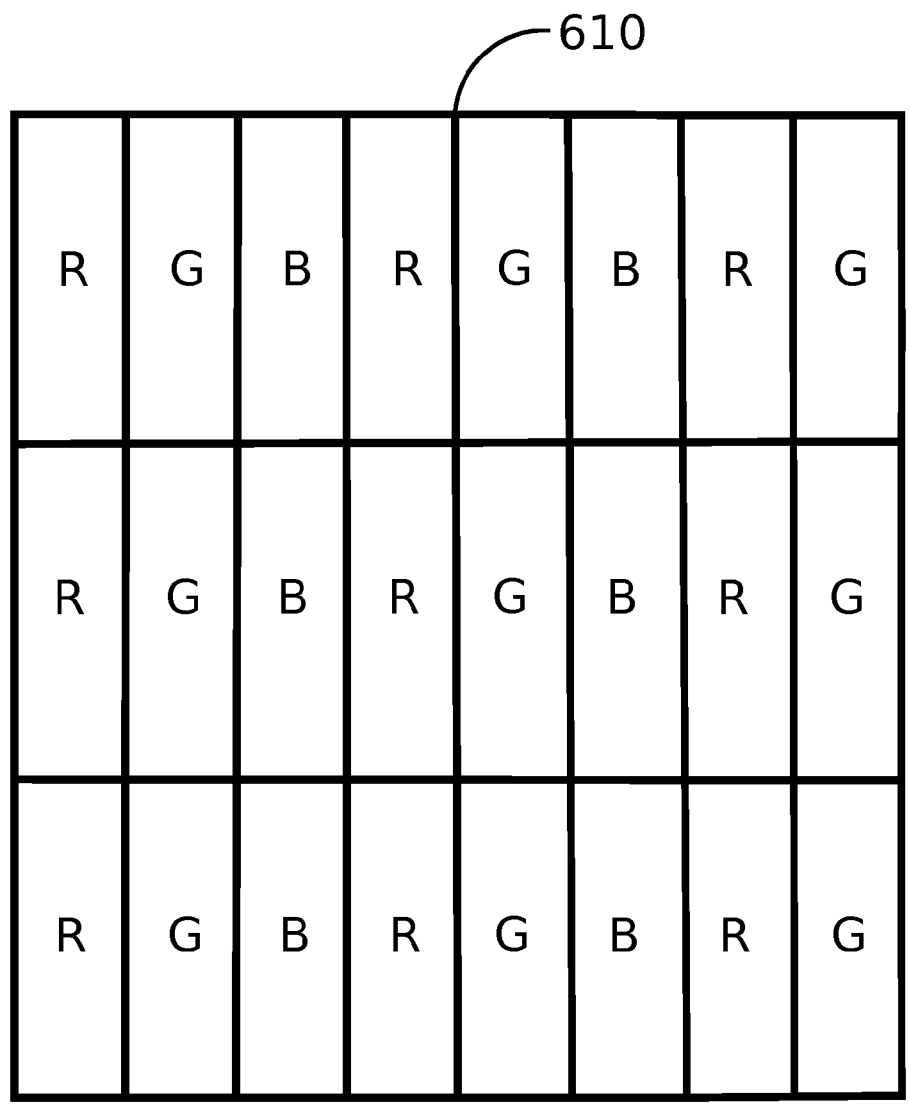
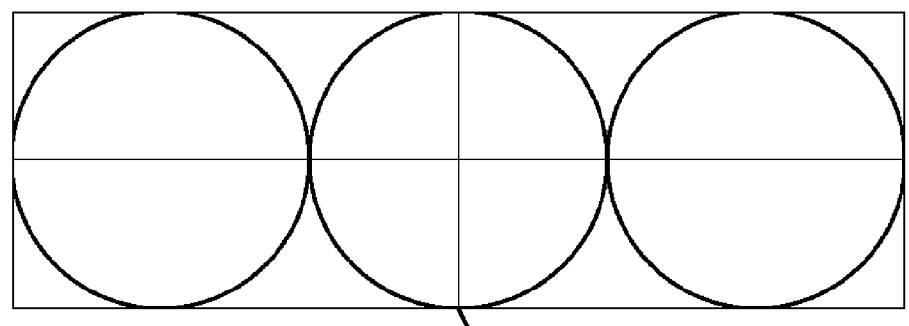
FIG. 6

```
function [R]=Reconstruct(sensor, CFA, ...
                         rowFactor, colFactor)
% Demosaicks rectangular pixels
% sensor    sensor data (MxNx1)
% CFA       CFA transmittivity pattern(mxnxc)
% R         reconstructed image (M2xN2xc)
% rowFactor, colFactor   ratio of sensor
% dimensions to those of input image % dimensions
M=size(sensor,1); %rows in sampled image
N=size(sensor,2); %columns in sampled image
M2 = M/rowFactor; %rows in input image
N2 = N/colFactor; %columns in input image
m=size(CFA,1); % size of CFA
n=size(CFA,2); % size of CFA
c=size(CFA,3); % number of colors r=0.5;%ratio of chrominance to luminance bandwidth R = zeros(M,N,c);
colSpace = zeros(m*n,c);

for k=1:c
  colSpace(:,k)=reshape(fft2(CFA(:,:,k)),[m*n,1]);
end

% invert matrix
colSpace = pinv(colSpace)*(m*n);
sensorFFT = fft2(sensor);

% Extract Chrominance
for i=1:m
  for j=1:n
    linearIndex = (j-1)*m + i;
    if linearIndex > 1
```

FIG.14A

```
        if sum(abs(colSpace(:,linearIndex)))...
                                    >=0.001)~=0
          % Shift from carrier to zero
          % and low pass filter
          rowShift = (i-1)*M/m;
          colShift = (j-1)*N/n;

y = circshift(sensorFFT,...
                        [-rowShift -colShift]);
          y = Lpf_Rect(y, r, rowFactor, colFactor);
          y = ifft2(y);

for k=1:c
            R(:,:,k)= R(:,:,k)+...
                      y*colSpace(k,linearIndex);
          end
        end
      end
    end
end % Extract luminance by subtracting modulated
% version of chrominance from sensor data
for k=1:c
  modulatedChroma = repmat(CFA(:,:,k),...
                           ceil([M/m,N/n]));
  modulatedChroma = modulatedChroma(1:M,1:N);
  sensor = sensor-R(:,:,k).*modulatedChroma;
end % combine luminance and chrominance
for k=1:c
    R(:,:,k)=R(:,:,k)+sensor*colSpace(k,1);
end % Restore original image dimensions
RFFT_orig = zeros(M2, N2, c);
```

FIG.14B

```
R_orig = zeros(size(RFFT_orig));
for k=1:c
   temp = fftshift(fft2(R(:,:,k)));
   RFFT_orig(:,:,k)=temp(M/2+1-M2/2:M/2+M2/2,...
                        N/2+1-N2/2:N/2+N2/2);
   R_orig(:,:,k) = real(ifft2(ifftshift(...
                        RFFT_orig(:,:,k))));
end % limit to 0-255
R = min(max(real(R_orig),0),255);
%----------------------------------------

Function Y = Lpf_Rect(X, r, rowFactor, colFactor)
% Handles rectangular pixels
% X is the FFT of the signal A = fftshift(X);

r = (r*size(A, 1)/2)/rowFactor;
r2 = r*r;
alpha = (size(A,1)/size(A,2))*rowFactor/colFactor;
alpha2 = alpha*alpha;

for i=1:size(A, 1)
   for j=1:size(A, 2)
      if (i-size(A,1)/2-1)^2 + alpha2*(j-...
                       size(A, 2)/2-1)^2 > r2
        A(i, j) = 0;
      end
   end
end % Take care of the edge
A(1:size(A, 1), 1)=0;

Y = fftshift(A);
```

FIG.14C

METHODS AND SYSTEM FOR SPECTRAL IMAGE SAMPLING

This application claims the benefit of U.S. Provisional Application No. 61/350,919, filed Jun. 3, 2010, and entitled, "Rectangular Pixels for Efficient Color Image Sampling," the entire contents of which are hereby incorporated by reference.

BACKGROUND OF THE INVENTION

1. Field of the Invention

Embodiments of the present invention relate to multi-spectral imaging systems such as color still cameras, video cameras, scanners and microscopes and more specifically to imaging systems that use fewer sensor elements than previous techniques for comparable image quality.

2. Background Information

Images herein can be considered signals whose amplitude may represent some optical property such as intensity, color and polarization which may vary spatially but not significantly temporally during the relevant measurement period. In color imaging, light intensity typically is detected by photosensitive sensor elements or photosites. An image sensor is composed of a two dimensional regular tiling of these individual sensor elements. Color imaging systems need to sample the image in at least three basic colors to synthesize a color image. We use the term "basic colors" to refer to primary colors, secondary colors or any suitably selected set of colors. We exclude color difference signals, many of which are used in popular color spaces, from the definition of basic colors. Furthermore, all references to red, green and blue should be construed to apply to any set of basic colors.

Color sensing may be achieved by a variety of means such as, for example, (a) splitting the image into three copies, separately filtering each into the basic colors, and sensing each of them using separate image sensors, or (b) using a rotating filter disk to transmit images filtered in each of the basic colors onto the same image sensor.

However, a very popular design for capturing color images is to use a single sensor but overlay each pixel with a color filter. The resulting mosaic of color filters is known as a color filter array ("CFA"). This includes the color stripe design wherein the value of each output pixel is determined by three sensing elements, one for each basic color, usually arranged in horizontal, vertical or diagonal stripes. This CFA yields red, green and blue images of equal resolution or, if some other color space is used, all color components of equal bandwidth. The color stripe CFA is still used in high end cameras such as the Panavision Genesis Digital Camera. Information about the Panavision Genesis camera may be obtained from Panavision Imaging at One Technology Place, Homer, N.Y. 13077. Newer CFA designs by Bayer (see FIG. 4 and B. E. Bayer, "Color imaging array", Jul. 20, 1976. U.S. Pat. No. 3,971,065) and others (see K. Hirakawa and P. J. Wolfe, "Spatio-spectral color filter array design for enhanced image fidelity" in Proc. of IEEE ICIP, pages II: 81-84, 2007 and L. Condat, "A New Class of Color Filter Arrays with Optimal Sensing Properties") make different trade-offs between luminance and chrominance bandwidths as well as the crosstalk between them.

In the paper "Color demosaicing by estimating luminance and opponent chromatic signals in the Fourier domain", Proc. IS&T/SID 10th Color Imaging Conf, pages 331-336, 2002, D. Alleysson, S. Susstrunk, and J. Herault analyzed electromagnetic filtering performed by CFAs as amplitude modulation of the color signals in the spatial domain (as used herein the terms "demosaic" and "demosaick" are to be construed as input image reconstruction procedures and the terms "demosaicer" and "demosaicker" as input image reconstruction algorithms). This led to frequency domain image reconstruction techniques that viewed the problem as that of demultiplexing the luminance and chrominance signals via demodulation and filtering. See E. Dubois, "Frequency-domain methods for demosaicking of bayer-sampled color images", IEEE Signal Processing Letters, 12(12):847-850, 200 and N. Lian, L. Chang, and Y. P. Tan, "Improved color filter array demosaicking by accurate luminance estimation" in IEEE International Conference on Image Processing, 2005, ICIP 2005, volume 1, 2005.

The complementary problem of designing CFAs with good frequency domain properties was attacked by D. Alleysson, S. Susstrunk, and J. Herault, "Linear demosaicing inspired by the human visual system", IEEE Transactions on Image Processing, 14(4):439-449, 2005 wherein the doubling of the number of blue photosites in the Bayer CFA at the expense of Green photosites was suggested. This was followed by techniques to design CFAs directly in the frequency domain by K. Hirakawa and P. J. Wolfe, "Spatio-spectral color filter array design for enhanced image fidelity" in Proc. of IEEE ICIP, pages II: 81-84, 2007 and optimized by L. Condat, "A New Class of Color Filter Arrays with Optimal Sensing Properties". These techniques fix the pattern of each basic color to consist of a small set of spatial "carriers"—two dimensional sinusoids and their aliases with appropriate frequencies, phases and amplitudes—and sum over the three basic colors to arrive at the final pattern. This pattern is then overlaid on the sensor. When an image formed by the camera's lens is filtered by the CFA, it is modulated by each of the carrier frequencies. The overlap of the modulation products of the 3 primaries induces a color transform and leads to a multiplex of luminance and chrominance signals modulated at different frequencies. As long as there is limited cross-talk between the color components, and the color transform is invertible the original color image can be recovered.

It is important to note the role of the CFA in determining the noise figure of the camera. The sensitivity of each photosite should be approximately uniform to control sensor saturation. Furthermore, the color transform should have a numerically stable inverse and the transmission of light through the CFA should be maximized.

An important consideration in the choice of sensor color space so far has been the high frequency content of chrominance signals. Well chosen color transforms result in chrominance signals with low high frequency content. This allows the chrominance signals to be placed close to each other and to the luminance signal in the frequency domain without significant cross-talk. See Y. Hel-Or, "The canonical correlations of color images and their use for demosaicing" and K. Hirakawa and P. J. Wolfe, "Spatio-spectral color filter array design for enhanced image fidelity" in Proc. of IEEE ICIP, pages II: 81-84, 2007 and L. Condat, "A New Class of Color Filter Arrays with Optimal Sensing Properties".

Unless otherwise specified, we shall use the term "resolution" to refer to linear resolution and assume it to be equal in all directions. We will also use the term "resolution", thus defined, interchangeably with the term "bandwidth".

An important factor influencing the close packing of color component signals is the geometry of their spectra. We use the term spectra to refer to the spatial Fourier transform of the image. The maximum spatial frequency along any direction that can be captured by a sampling lattice is inversely proportional to the lattice pitch along that direction as per the Nyquist theorem. Square and rectangular sampling lattices admit higher bandwidth along the diagonal directions than along horizontal or vertical. Optical systems, on the other hand, generate roughly equal bandwidth along all directions thereby yielding images with nearly circular spectral support. This leads to the problem of efficiently packing circles into squares or rectangles.

An aggressive technique for close packing of color component spectra employs adaptive directional techniques during demosaicking. These techniques assume the color component spectra of small image patches to be sparse in at least one direction. They design their CFA to generate more than one copy of chrominance spectrum (see B. E. Bayer, "Color imaging array", Jul. 20, 1976, U.S. Pat. No. 3,971,065), identify the cleanest copy during the demosaicking step and use directional filtering to demultiplex them (see Ron Kimmel, "Demosaicing: Image reconstruction from color ccd samples", IEEE Trans. Image Processing, 8:1221-1228, 1999 and E. Chang, S. Cheung, and D. Y. Pan, "Color filter array recovery using a threshold-based variable number of gradients", in Proceedings of SPIE, volume 3650, page 36, 1999 and K. Hirakawa and T W Parks, "Adaptive homogeneity-directed demosaicing algorithm", IEEE Transactions on Image Processing, 14(3):360-369, 2005 and E. Dubois, "Frequency-domain methods for demosaicking of bayer-sampled color images", IEEE Signal Processing Letters, 12(12):847-850, 2005). The benefits of adaptive directional demosaicking come at a heavy cost, though, since sensing edge directions from noisy sub-sampled images is a hard problem and the non-linear nature of decision making makes noise reduction a non-separable step.

For a frequency domain analysis of the popular Bayer CFA, see E. Dubois, "Frequency-domain methods for de-mosaicking of bayer-sampled color images", IEEE Signal Processing Letters, 12(12):847-850, 2005. FIG. 4 shows the Bayer CFA 410. 710 in FIG. 7 illustrates how color information with its circular support is packed into the sensor's rectangular support. This can be most easily understood in terms of an alternative color space:

$$\begin{bmatrix} L \\ C1 \\ C2 \end{bmatrix} = \frac{1}{4} \begin{bmatrix} 1 & 2 & 1 \\ -1 & 2 & -1 \\ -1 & 0 & 1 \end{bmatrix} \begin{bmatrix} R \\ G \\ B \end{bmatrix} \quad (1)$$

The central circle represents the Luminance (L) spectrum. The four quarter circles at the vertices make up Chrominance1 (C1). The two semi-circles at the left and right edges make up the first copy of Chrominance2 (C2a). The two semi-circles at the top and bottom edges make up the second copy of Chrominance2 (C2b).

It's apparent from this figure that there is empty space between circles that corresponds to unused frequencies. The present invention minimizes such inefficiency.

Existing sensor designs predominantly use square pixels. This includes sensors used with the Bayer CFA. Designs using rectangular sensor elements do exist. The grass valley Viper camera (see http://www.grassvalley.com/docs/Brochures/cameras/viper/viper_br.pdf, page 7) uses rectangular sensor elements so as to facilitate combining of multiple elements into single effective elements thereby realizing configurable sensor resolutions. For more information, Grass Valley can be reached at 400 Providence Mine Road, Nevada City, Calif. 95959.

Video systems that must maintain compatibility with analog NTSC or PAL broadcast television standards also use rectangular pixels. Scan rates of horizontal scanning lines in these analog systems control the vertical resolution and the video circuit bandwidth controls the horizontal resolution. The ITU (see ITU-R, "Recommendation BT.601-6: Studio encoding parameters of digital television for standard 4:3 and wide screen 16:9 aspect ratios") specifies different pixel height and width to capture digital video with these different vertical and horizontal resolutions.

The color stripe sensor uses rectangular pixels wherein the longer sides are 3 times the length of the shorter. As it uses three primary colors, this gives it equal resolution in the vertical and horizontal directions.

BRIEF SUMMARY OF THE INVENTION

The present invention relates to spectral image sampling. In accordance with an embodiment of the invention, a method of sampling an image is disclosed. The image is projected onto an array of optical transformation devices. Image intensity values transmitted by said array of optical transformation devices are detected at each sensor element of an image sensor. The image sensor comprises a plurality of photosensitive sensor elements configured to detect a magnitude of incident light, wherein said sensor elements are shaped as uniform and regular polygons whose aspect ratio is controlled to minimize sensor element count while obtaining a desired image quality. The detected image intensity values are processed to infer the image.

An alternative method of sampling an image is disclosed. In this embodiment, the image is projected onto a color filter array. The color filter array is configured according to a desired resolution for a detected chrominance signal. Image intensity values transmitted through said color filter array are detected at each sensor element of an image sensor. The image sensor comprises a plurality of photosensitive sensor elements configured to detect a magnitude of incident light. The detected image intensity values are processed to infer the image.

An image sampling apparatus is disclosed. The apparatus comprises a color filter array having a plurality of color filters, an image sensor having a plurality of photosensitive sensor elements; and a processor. The color filter array is configured such that, in at least one frequency domain representation of at least one image captured using the plurality of photosensitive elements, at least one spectral copy of a chrominance signal is positioned so as to minimize overlap between the chrominance signal and a luminance signal in the at least one frequency domain representation. The color filters of the color filter array each has a non-square rectangular shape. Each sensor element of the image sensor is configured to detect a magnitude of incident light. The processor receives the detected image intensity values.

An alternative method of sampling at least one image is disclosed. Electro-magnetic radiation is filtered using a color filter array comprising a plurality of color filters, the color filter array being configured such that, in at least one frequency domain representation of at least one image captured using the plurality of photosensitive elements, at least one spectral copy of a chrominance signal is positioned so as to minimize overlap between the chrominance signal and a luminance signal in the at least one frequency domain representation, and wherein the color filters of the color filter array each has a non-square rectangular shape; and the filtered electromagnetic radiation is detected with an image sensor comprising a plurality of photosensitive sensor elements. Each sensor element is configured to detect a magnitude of incident light. The detected electromagnetic radiation is processed the to infer an image.

A method of processing at least one color image is disclosed. A detected electromagnetic radiation is received, the electromagnetic radiation being representative of an image. A mosaicked representation of the image is stored on a machine readable storage medium, wherein the representation of the image includes a plurality of indications of magnitudes of light. Each magnitude of light corresponds to a magnitude of at least one color of light at one of a plurality of locations in the image. A frequency domain representation of the plurality of magnitudes of light has a channel shape that is substantially non-square and in which chrominance and luminance are positioned to minimize overlap in the frequency domain representation.

A method for image processing is disclosed. Image data is transformed into at a luminance signal and a chrominance signal. A frequency domain representation of the luminance signal and the chrominance signal is contained within a non-square rectangular shape. Overlap between the luminance signal and the chrominance signal in the frequency domain representation is minimized. The image data is processed to infer an image.

These and other embodiments of the present invention are described in more detail herein.

BRIEF DESCRIPTION OF THE DRAWINGS

FIG. 3 shows a monochrome image and it's spectral image FIG. 6 shows the color stripe CFA and its corresponding carriers in the frequency domain. The frequency domain plot here as well as in the following figures, span the frequency range $[-\pi, \pi)$ radians/sample in the horizontal and vertical directions but are scaled in the inverse ratio of pixel pitch in these directions.

FIGS. 14A-C show a code listing of a Matlab simulation of an exemplary embodiment of the invention showing image reconstruction.

DETAILED DESCRIPTION OF THE INVENTION

Image sensors are almost always composed of a regular tiling of square sensor elements. Such a sensor is capable of capturing spatial frequencies that lie in a square region in the frequency domain. Optical systems, on the other hand, generate roughly equal resolution in all directions thereby yielding images with nearly circular spectral support. This could be due to inherently isotropic resolution limitations of lenses or introduced by design using Optical Low Pass Filters (OLPF).

In single sensor color imaging, the image is first filtered through a Color Filter Array (CFA) before being sensed. This results in color dependent amplitude modulation which, in the frequency domain, creates luminance and chrominance spectra centered about different spatial carrier frequencies. The CFA design dictates the carrier frequencies and thereby the efficiency with which the roughly circular luminance and chrominance spectra are packed within the square Fourier support of the sensor. We use a simplified model of the spectra, taking them to be exactly circular, and determine the CFA carrier frequencies that result in optimal packing, leading to greater resolution, or less crosstalk, or both, for a given number of photosites. Besides the case where luminance and chrominance spectra are circular with equal radii, we also compute the optimal packing solution for the reduced chrominance resolution case, which reduces sensor element count.

While the above optimal packing was done using square pixels, pixel aspect ratio is next introduced as an important design parameter determining packing efficiency. Reducing pixel pitch in one direction only, leads to the sensor being able to capture higher spatial frequencies in that direction. Pixel aspect ratio can thereby be used to control the aspect ratio of the rectangular region in the frequency domain that the sensor is able to capture image information in. The latter affects the efficiency with which roughly circular luminance and chrominance spectra can be packed into the sensor's rectangular Fourier support. We demonstrate this using the previously described exactly circular model of luminance and chrominance spectra by computing the pixel aspect ratio and CFA carriers that lead to the most efficient packing.

The use of pixel aspect ratio to achieve greater resolution, or less crosstalk, or both, for a given number of photosites is the primary contribution of the present invention. While this is model independent, another contribution is the computation of the optimal pixel aspect ratio and CFA carriers within the simple circular model of image spectral support. Another contribution is the optimization of CFAs for given luminance and chrominance resolutions.

Figure 1:
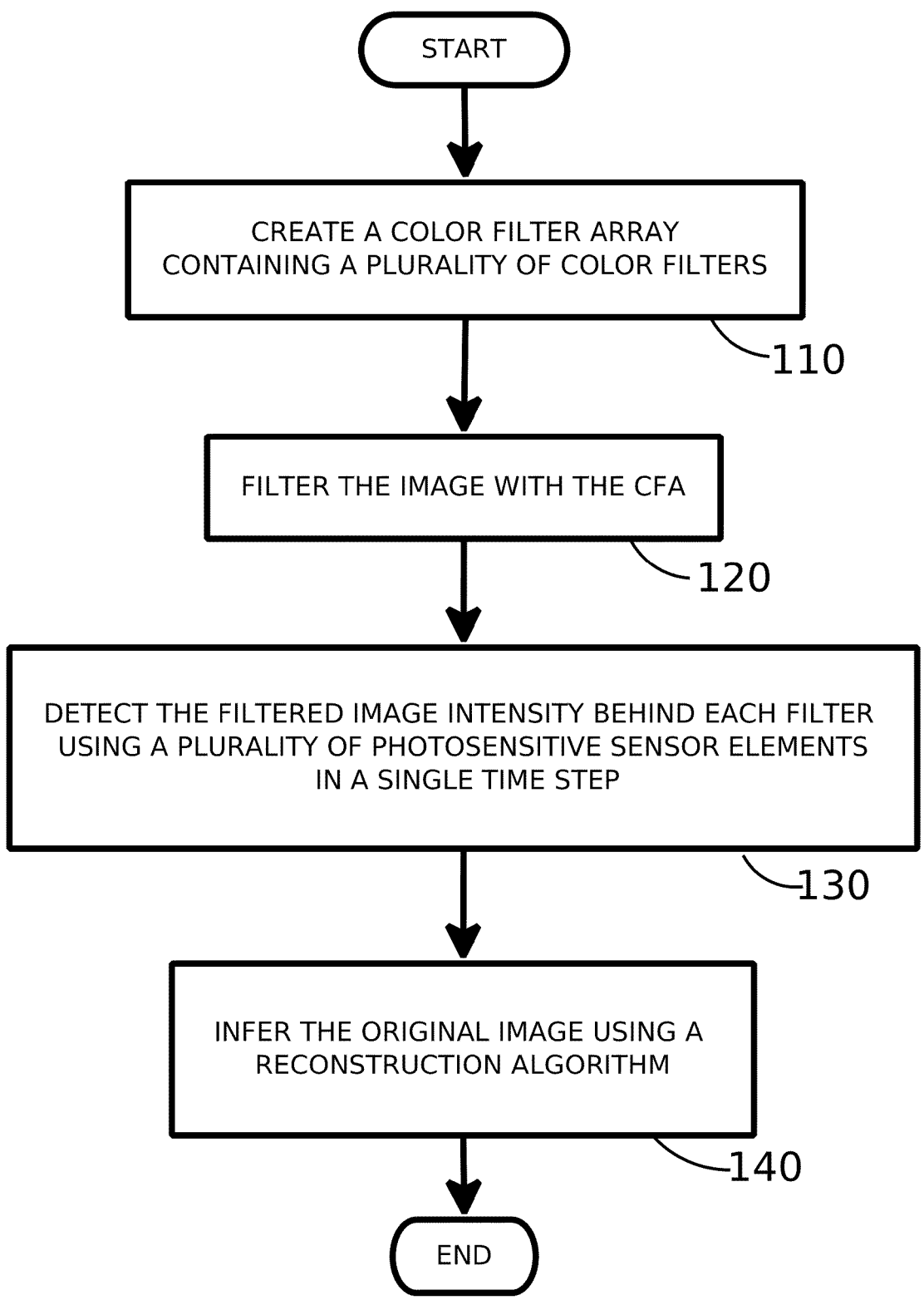
FIG. 1 is a flowchart showing an exemplary method for sampling a color image with a CFA in accordance with an embodiment of the present invention

The present invention works within the broad framework of a standard Color Filter Array based color imaging system. FIG. 1 is a flowchart showing an exemplary method of color imaging, in accordance with an embodiment of the present invention. In step 110, a Color Filter Array is created. In step 120, the incident image is filtered through this CFA. In step 130, the filtered image is detected by an image sensor after it is exposed to it. In step 140, the image is reconstructed from the image sensor output and the CFA pattern.

Figure 2:
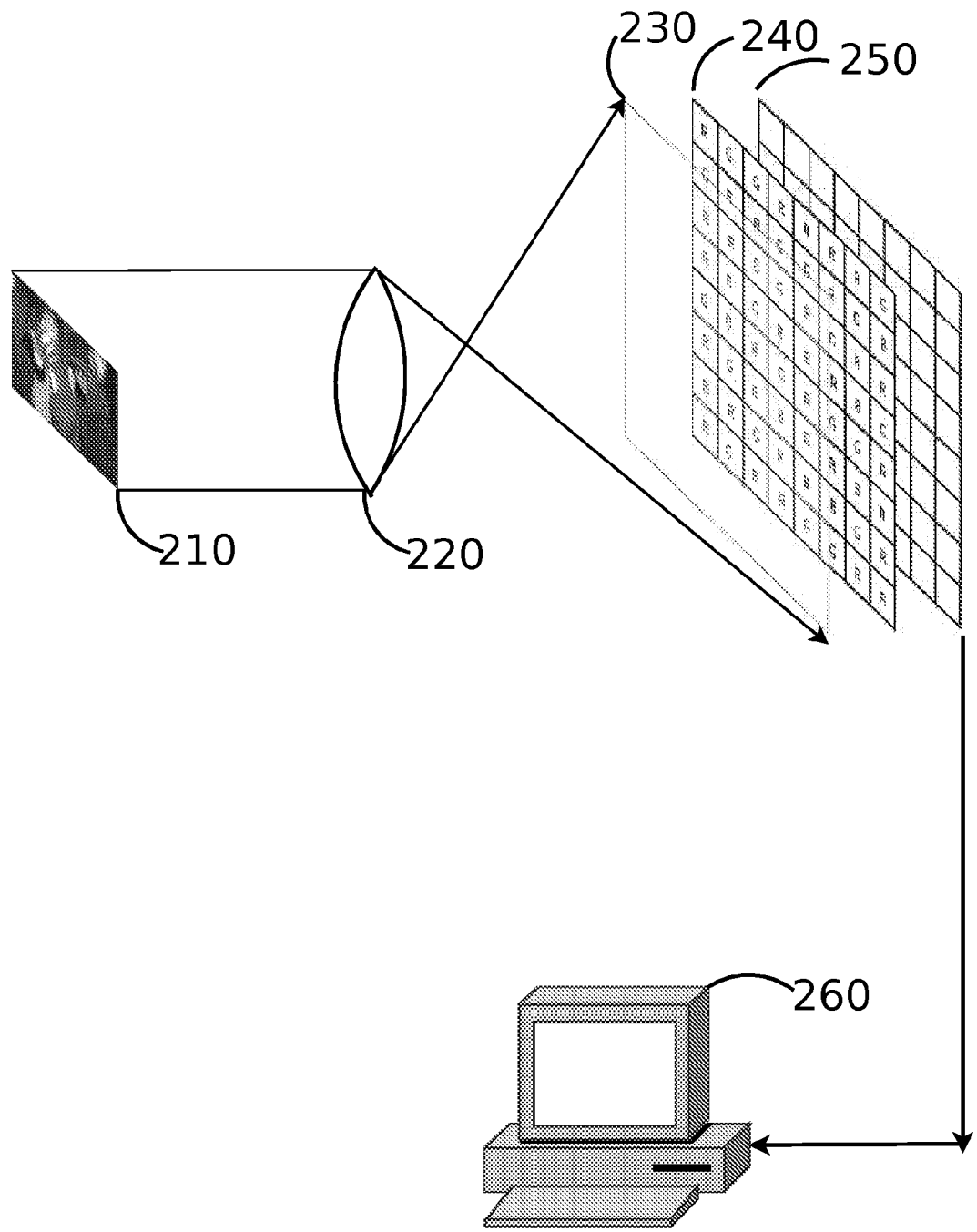
FIG. 2 is a schematic diagram of an exemplary color imaging system in accordance with an embodiment of the present invention
Figure 4:
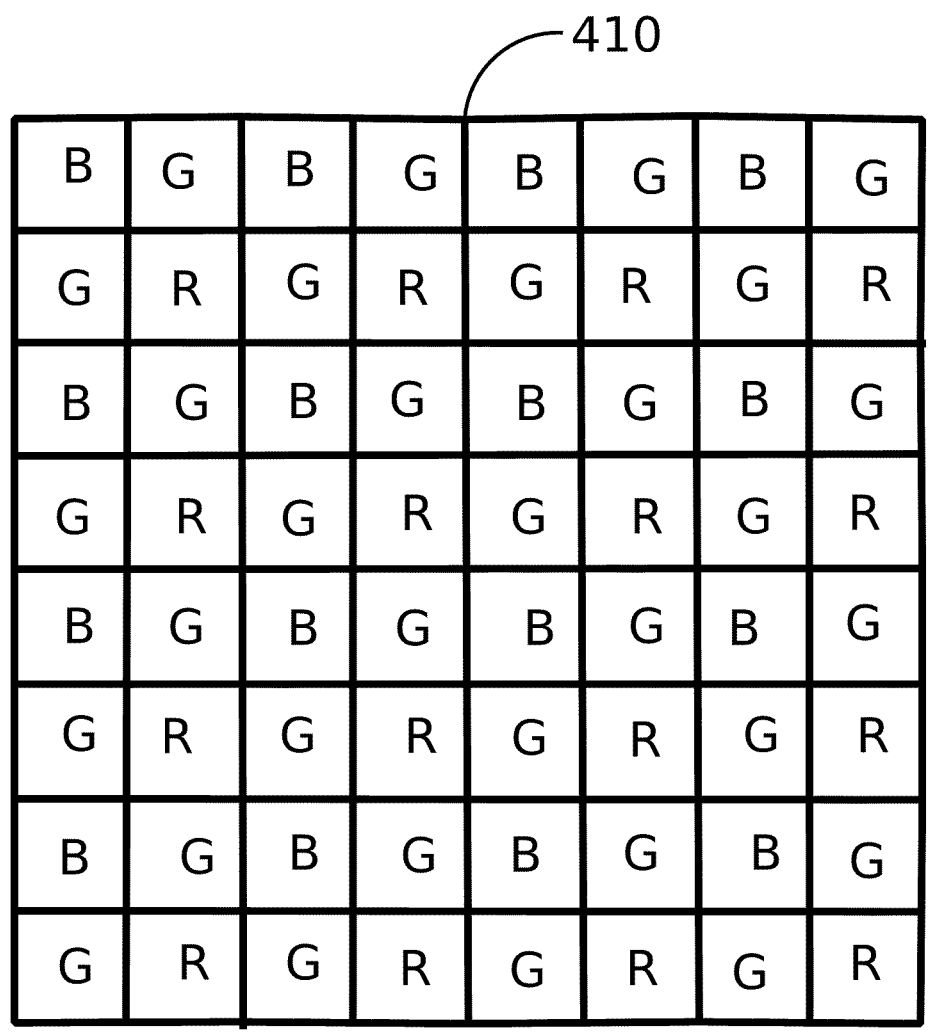
FIG. 4 shows the popular Bayer Color Filter Array FIG. 5 Illustrates amplitude modulation by various real carriers in the frequency domain

FIG. 2 is a schematic diagram of an imaging system, in accordance with an embodiment of the present invention. Image 210 is focused by lens 220 optionally onto an Optical Low Pass Filter 230 and then filtered by Color Filter Array 240. The filtered image is detected by image sensor 250. The resulting plurality of sensed filtered image intensity values is sent to processor 260 where image reconstruction is performed.

Pixel pitch along an axis is defined as the distance between the centers of successive pixels along the said axis. Pixel aspect ratio is defined as the ratio of the pixel pitches along the two axes of the rectangular sensor lattice. The geometry of the light gathering area, such as the micro lens, or the light sensitive area of the photosites, such as the photodiode, do not affect the pixel pitch or aspect ratio. It should be understood that the pixel pitch and aspect ratio of both the sensor and the CFA are identical since there is a one to one correspondence between sensor and CFA pixels.

In the frequency domain analysis of the image capture process, it is convenient to view the sensor as a channel that conveys a range of two dimensional spatial frequencies. This is analogous to a communication system that conveys a range of one dimensional temporal frequencies. Unlike 1 dimensional channels, 2 dimensional channels have a notion of geometry derived from plotting the set of all spatial frequencies conveyed by the channel such that the point ($\omega_1$, $\omega_2$) on the Euclidean plane corresponds to the spatial frequency ($\omega_1$, $\omega_2$) radians/mm. Thus, a sensor with a square pixels has a square channel while a sensor with rectangular pixels has a rectangular channel with aspect ratio that is the inverse of the pixel aspect ratio. Furthermore, the area of a sensor channel is inversely proportional to its pixel area and directly proportional to its pixel density.

Optical images typically have roughly equal resolution in all directions so that their spectra are circular in shape. The problem of capturing color images is thus reduced to packing the circular spectra of image color components into the square or rectangular sensor channel. In the present invention we design CFAs to accomplish this task by amplitude modulation.

Amplitude Modulation in the Discrete Domain

Figure 5:
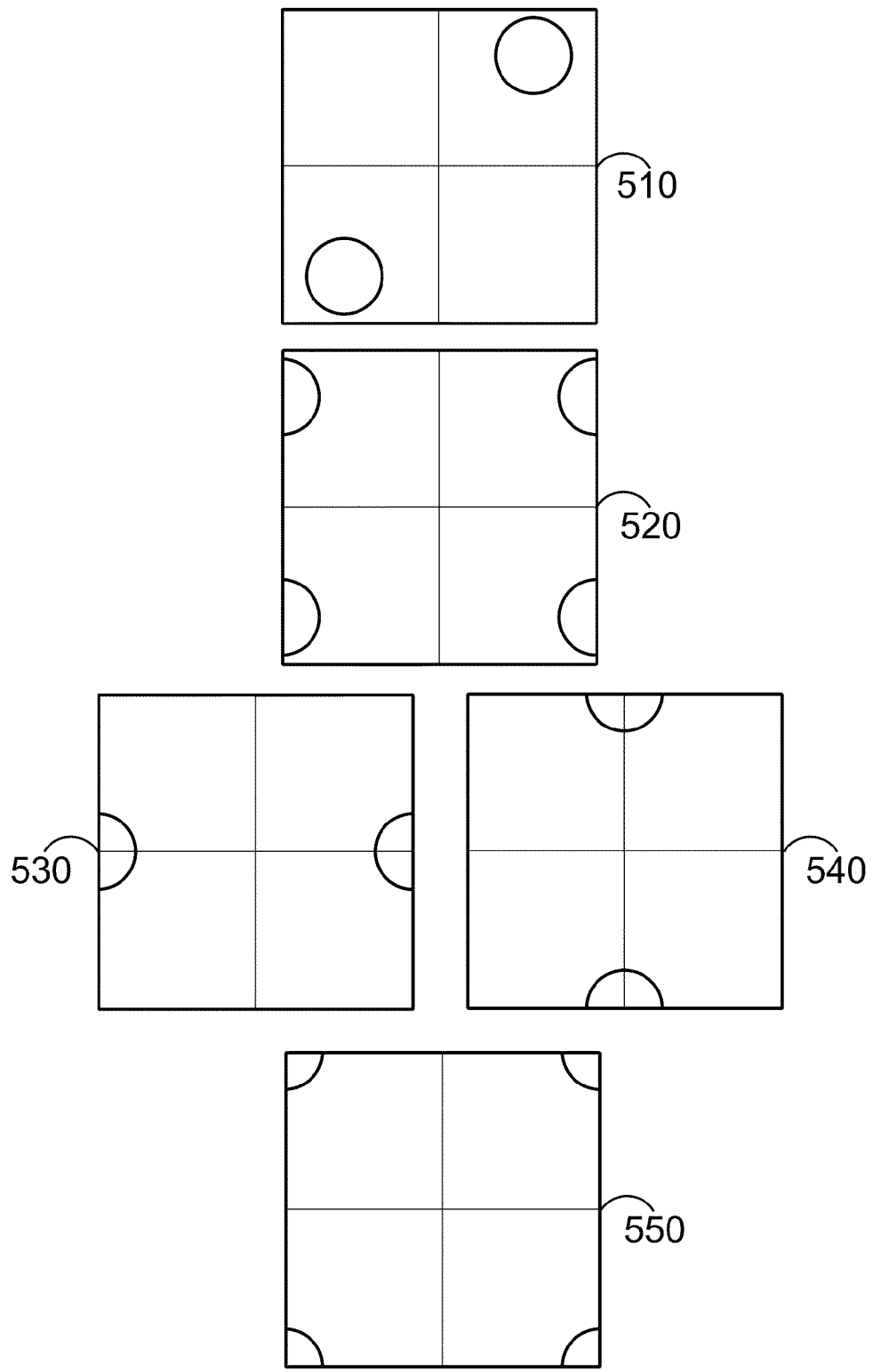

Modulating a two dimensional signal with a carrier of frequency $\omega=[\omega_1 \omega_2]$, $-\pi \leq \omega_1, \omega_2 < \pi$ yields a shifted spectral copy of the signal—known as a sideband—centered about $\omega$. A real carrier composed of a conjugate pair of sinusoids of frequencies $\pm[\omega_1 \omega_2]$, $-\pi \leq \omega_1 \omega_2 < \pi$ generates two shifted spectral copies of the baseband as shown in 510 in FIG. 5. Each circle represents a copy of the signal spectrum. $\omega$ and $-\omega$ are the centers of the two circles in the figure.

A carrier of frequency $[\pi \omega_2]$, $-\pi \leq \omega_2 < \pi$, $\omega_2 \neq 0$, is aliased to another at frequency $[-\pi \omega_2]$ and generates sidebands about both carriers. However, sideband frequencies $<-\pi$ and $\geq \pi$ are aliased resulting in only one complete spectral copy of the baseband. A real carrier consisting of a conjugate pair $\pm[\pi \omega_2]$ is similarly aliased to $\pm[-\pi \omega_2]$ and generates two spectral copies of the baseband signal as shown in 520 in FIG. 5. The case of $[\omega_1 \pi]$–$\pi \leq \omega_1 < \pi$, $\omega_1 \neq 0$, is symmetrical.

In the special case of a real carrier composed of the conjugate sinusoid pair $\pm[\pi 0]$, the aliases collapse to the same sinusoid pair. Since sideband frequencies $<-\pi$ and $\geq \pi$ are aliased this results in just one spectral copy of the baseband as shown in 530 in FIG. 5. The case of $\pm[0\,\pi]$ is symmetrical as shown in 540 in FIG. 5.

Another special case arises with the real carrier composed of a conjugate sinusoid pair $\pm[\pi \pi]$. Along with its aliases, this carrier occupies the four corner frequencies $[\pm \pi \pm \pi]$ as shown in 550 in FIG. 5. Since only a quarter of a spectral copy of the baseband signal survives aliasing at each corner, a total of just one spectral copy is preserved.

Frequencies are a precious resource in sensor channels and attempts are made to avoid duplicating spectral copies. A natural strategy is to use the carrier frequencies that result in a single spectral copy as mentioned above. See B. E. Bayer, "Color imaging array", Jul. 20, 1976, U.S. Pat. No. 3,971,065 and K. Hirakawa and P. J. Wolfe, "Spatio-spectral color filter array design for enhanced image fidelity", in Proc. of IEEE ICIP, pages II: 81-84, 2007. An alternate strategy is to use carrier frequencies that generate two sidebands but multiplex two signals by varying the phase of the carrier for each. Quadrature modulation (see L. Condat, "A New Class of Color Filter Arrays with Optimal Sensing Properties") is one such technique wherein the phase difference between the carriers is set to $$\frac{\pi}{2}.$$

CFA Design in the Frequency Domain

Consider a photosite located at $n=[n_1\ n_2]$ that filters incident light $x(n)=[x_r(n)\ x_g(n)\ x_b(n)]^T$ through color filter array $c(n)=[c_r(n)\ c_g(n)\ c_b(n)]$ and measures the resulting, scalar signal $y(n)$, where $$y(n)=c(n)\cdot x(n) \qquad (2)$$

Consider a set of m real carrier sinusoids $s^{(k)}(n)$, $1 \leq k \leq m$ of unit amplitude, frequencies $\omega^{(k)}=[\omega_1^{(k)}, \omega_2^{(k)}]$ and phases $$\phi^{(k)} \in \{0, \frac{\pi}{2}\},$$

given by $$s^{(k)}(n) = \frac{e^{j(\omega^{(k)}\cdot n + \phi^{(k)})} + e^{-j(\omega^{(k)}\cdot n + \phi^{(k)})}}{2} \qquad (3)$$

where $j=\sqrt{-1}$. Each color of the CFA, $c_i(n)$, $i \in \{r, g, b\}$, is the superposition of these carriers scaled by an appropriate real amplitude $\alpha_i^{(k)}$, $$c_i(n) = \sum_{k=1}^{m} \alpha_i^{(k)} s^{(k)}(n) \qquad (4)$$

The choice of carrier frequencies is a CFA design decision except for the DC component, whose presence is essential for all physically realizable CFAs. For this reason we set $\omega^{(1)}=[0\ 0]$. It follows that $\alpha_i^{(1)}>0$, $i \in \{r, g, b\}$.

Once the sensor is exposed to image $x(n)$ and its mosaiced output $y(n)$ is captured, a demosaicking step is needed to reconstruct $x(n)$. Assuming the carrier frequencies $\omega^{(k)}$, $1 \leq k \leq m$ are sufficiently separated so that sidebands centered about them do not overlap, each modulated signal can be recovered by multiplication with its respective carrier followed by convolution with a low pass filter $h^{(k)}$. Formally, $$u^{(k)}(n)=(h^{(k)}*(s^{(k)}\cdot y))(n) \qquad (5)$$

Each $u^{(k)}(n)$, $0 \leq k \leq m$ can be viewed as a color component. Motivated by the fact that $\alpha_i^{(1)} > 0$, $i \in \{r, g, b\}$, we loosely refer to $u^{(1)}(n)$ as the luminance signal, and $u^{(k)}(n)$, $k > 1$ as the chrominance signals.

Since $u(n) = [u^{(1)}(n) \, u^{(2)}(n) \ldots u^{(m)}(n)]^T$ is generated by the modulation of the incident image $x(n)$, it can be written as $$u(n) = A \cdot x(n) \quad (6)$$

where $$A = \begin{bmatrix} a_r^{(1)} & a_g^{(1)} & a_b^{(1)} \\ a_r^{(2)} & a_g^{(2)} & a_b^{(2)} \\ \vdots & \vdots & \vdots \\ a_r^{(m)} & a_g^{(m)} & a_b^{(m)} \end{bmatrix}.$$

A can be interpreted as the color transform matrix, and provided its rank is 3, x can be recovered by $$x(n) = A^{-1} \cdot u(n) \quad (7)$$

Here $A^{-1}$, the generalized inverse of A, can be interpreted as the inverse color transform.

From the above discussion it is clear that there are three classes of decision variables for a CFA design, namely the carrier frequencies $\omega^{(k)}$, $1 \leq k \leq m$, phases $\Phi^{(k)}$, $1 \leq k \leq m$ and amplitudes given by the matrix A.

CFA Optimization

Equation 6 shows that the carrier amplitudes determine the color transform. A good choice of A generates chrominance signals with minimal high frequency energy content (see Y. Hel-Or, "The canonical correlations of color images and their use for demosaicing") thereby enabling a close packing of luminance and chrominance spectra.

Let c1, c2 and l form a color space so that, $$\begin{bmatrix} l \\ c1 \\ c2 \end{bmatrix} = \begin{bmatrix} \frac{1}{\sqrt{3}} & 0 & 0 \\ 0 & \frac{1}{\sqrt{2}} & 0 \\ 0 & 0 & \frac{1}{\sqrt{6}} \end{bmatrix} \begin{bmatrix} 1 & 1 & 1 \\ 1 & -1 & 0 \\ 1 & 1 & -2 \end{bmatrix} \begin{bmatrix} R \\ G \\ B \end{bmatrix} \quad (8)$$

where l is the luminance axis and c1, c2 are the chrominance axes.

It has been shown by Y. Hel-Or, "The canonical correlations of color images and their use for demosaicing", HP Laboratories Israel, Tech. Rep. HPL-2003-164R1, Feb. 2004 that c1, c2 and l can be considered statistically independent and hence the bandwidth of the chrominance signals is small for most images. We further note that the sufficient condition for chrominance signals to have low average bandwidth is that they be orthogonal to the luminance signal l defined above. As such rotation of either c1 or c2 axes defined above does not significantly affect the bandwidth of chrominance signals for most images.

Electrical and thermal noise are additive Gaussian and Poissonian photon shot noise can be approximated by an additive Gaussian for all but the very low values. Amplification of additive Gaussian noise is minimized if luminance and chrominance form an orthogonal basis, such as l, c1, c2 defined in equation 8 or any rotation thereof.

By using quadrature modulation, we limit the choice of carrier phases, $\Phi^{(k)}$, to the pair $$\{0, \frac{\pi}{2}\}.$$

This does not curtail the space of CFA designs since varying the carrier phase is equivalent to rotating the chrominance axes c1, c2.

Optimal Packing of Spectra

The term "Spectral Overlap" is defined to refer to the condition wherein parts of two or more signal spectra occupy the same frequency after modulation with the CFA. The severity of spectral overlap depends on the bandwidth and energy content of the overlapping parts of the signals.

Chrominance Bandwidth Ratio, r, of a CFA is defined as the maximum ratio of chrominance and luminance resolutions of the input image that does not cause spectral overlap in a CFA for a given luminance bandwidth. Another parameter of the problem—crosstalk—depends on the input image and has to be empirically determined. However, crosstalk is monotonically decreasing with r and thus r serves as a reasonable surrogate for it.

Figure 18A:
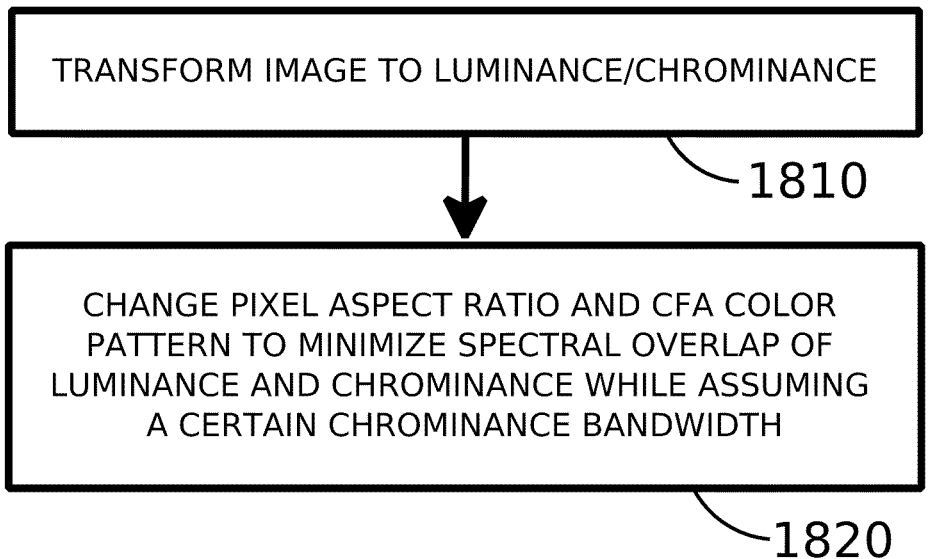
FIG. 18 is a flowchart showing two methods of CFA optimization in accordance with two embodiments of the present invention.
Figure 18B:
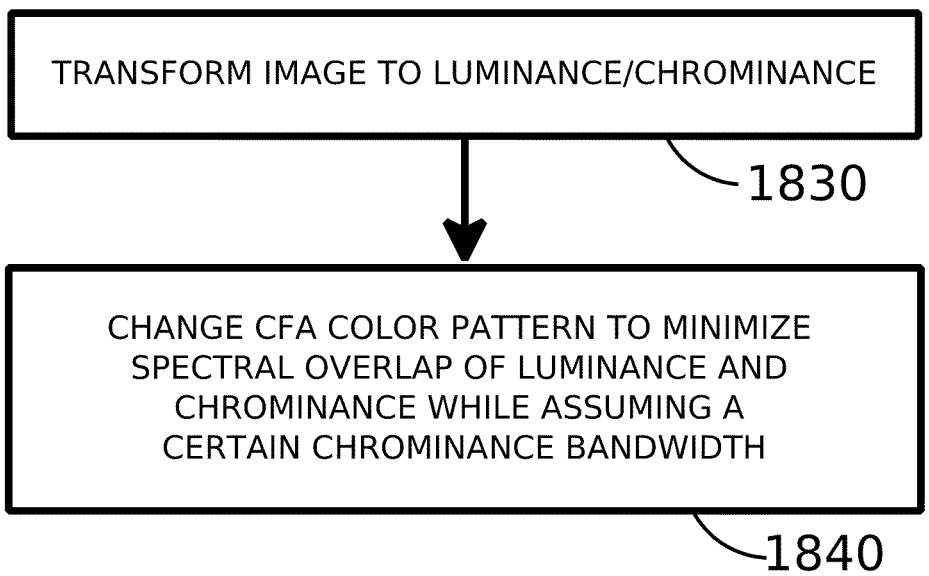

FIG. 18A and FIG. 18B are flowcharts showing two methods of CFA optimization in accordance with two embodiments of the present invention. In FIG. 18A step 1810 the image is transformed into the Luminance, Chrominance color space. In step 1820, Pixel aspect ratio and CFA color pattern are optimized so as to minimize overlap between the Luminance and Chrominance channels. This may be done while assuming Chrominance bandwidth to be limited to a predetermined value for the purposes of computing overlap. FIG. 18B is similar except in step 1840 it does not modify pixel aspect ratio. Even without pixel aspect ratio modification, new optimal color patterns are found for square pixels, for predetermined Chrominance bandwidths.

Consider a camera with an optical system that resolves spatial frequencies up to a maximum of $\omega^*$ radians/mm. This limit can be enforced by an Optical Low Pass Filter or may just be the resolving limit of the lens or other optical component.

A monochrome sensor with pixel pitch of $$\frac{\pi}{\omega^*}$$

mm is required to sample this image at the Nyquist limit.

The CFA color pattern and pixel aspect ratio with minimum pixel count needed to capture an image with a given luminance resolution $\omega^*$ and chrominance resolution $r\omega^*$ takes the following form:

$$c_{c1}(n) = a(e^{j(\omega_1 n_1 + \pi n_2)} + e^{-j(\omega_1 n_1 + \pi n_2)})$$

$$c_{c2}(n) = b(e^{j(\omega_1 n_1 + \pi n_2 + \frac{\pi}{2})} + e^{-j(\omega_1 n_1 + \pi n_2 + \frac{\pi}{2})})$$

$$c_l(n) = c$$

where $j = \sqrt{-1}$. $c_i(n)$, $i \in \{r, g, b\}$ can be directly computed from the above equations and equations 4, 8.

The CFA design of the present invention modulates two color difference signals with a pair of carriers in quadrature at frequencies $(\pm \omega_i, \pm \omega \pi)$ radians/sample and leaves a third color signal, luminance, unmodulated. The parameters have different form in each of four ranges of the Chrominance Bandwidth Ratio, r, as presented in Table 1. $d_x$ and $d_y$ here are defined as the pixel pitch in the x and y directions respectively.

The choice of amplitudes a, b and c do not affect packing efficiency. Large values of a, b result in strong chrominance signals and thereby low color noise and good color separation. Large value of c, on the other hand, results in high transmissivity of the CFA and thereby high sensitivity. Maximizing the chrominance carrier amplitudes a, b and the luminance gain, c, are conflicting objectives and the trade-off depends on the application for which the camera is designed. A low light camera might benefit from a large c while a studio camera—where lighting can be controlled—would do better with large a, b. Example values will be given for some CFA designs for the purpose of illustration.

TABLE 1

Tight Packed CFA design as a function of the Chrominance Bandwidth Ratio r

| r | $d_x$ (mm) | $d_y$ (mm) | AspectRatio | $\omega_1$ (rad/sample) |
|---|---|---|---|---|
| [0.644, 1] | $\dfrac{\pi}{\left(\sqrt{(1+r)^2-1}+r\right)\omega^*}$ | $\dfrac{\pi}{\omega^*}$ | $\sqrt{(1+r)^2-1}+r$ | $\dfrac{\sqrt{(1+r)^2-1}}{\sqrt{(1+r)^2-1}+r}\pi$ |
| [0.5, 0.644] | $\dfrac{\pi}{2r\omega^*}$ | $\dfrac{\pi}{\sqrt{(2r+1)}\,\omega^*}$ | $\dfrac{2r}{\sqrt{2r+1}}$ | $\dfrac{1}{2}\pi$ |
| [0.25, 0.5] | $\dfrac{\pi}{\omega^*}$ | $\dfrac{\pi}{2\sqrt{r}\,\omega^*}$ | $\dfrac{1}{2\sqrt{r}}$ | $(1-r)\pi$ |
| [0, 0.25] | $\dfrac{\pi}{\omega^*}$ | $\dfrac{\pi}{\omega^*}$ | 1 | $(1-r)\pi$ |

We refer to the design given in table 1 as the Tight Packed CFA. The Tight Packed CFA minimizes the pixel count of the CFA without allowing Spectral Overlap for input images with the specified Chrominance Bandwidth Ratio r. A symmetric solution with similar characteristics can be obtained by transposing the x and y axes of the sensor, and will not be described further.

Reducing r below 0.25 does not lead to a decrease in photosite count. The CFA design for this range is not unique and one possible design is listed for comparison with other designs.

Figure 8:
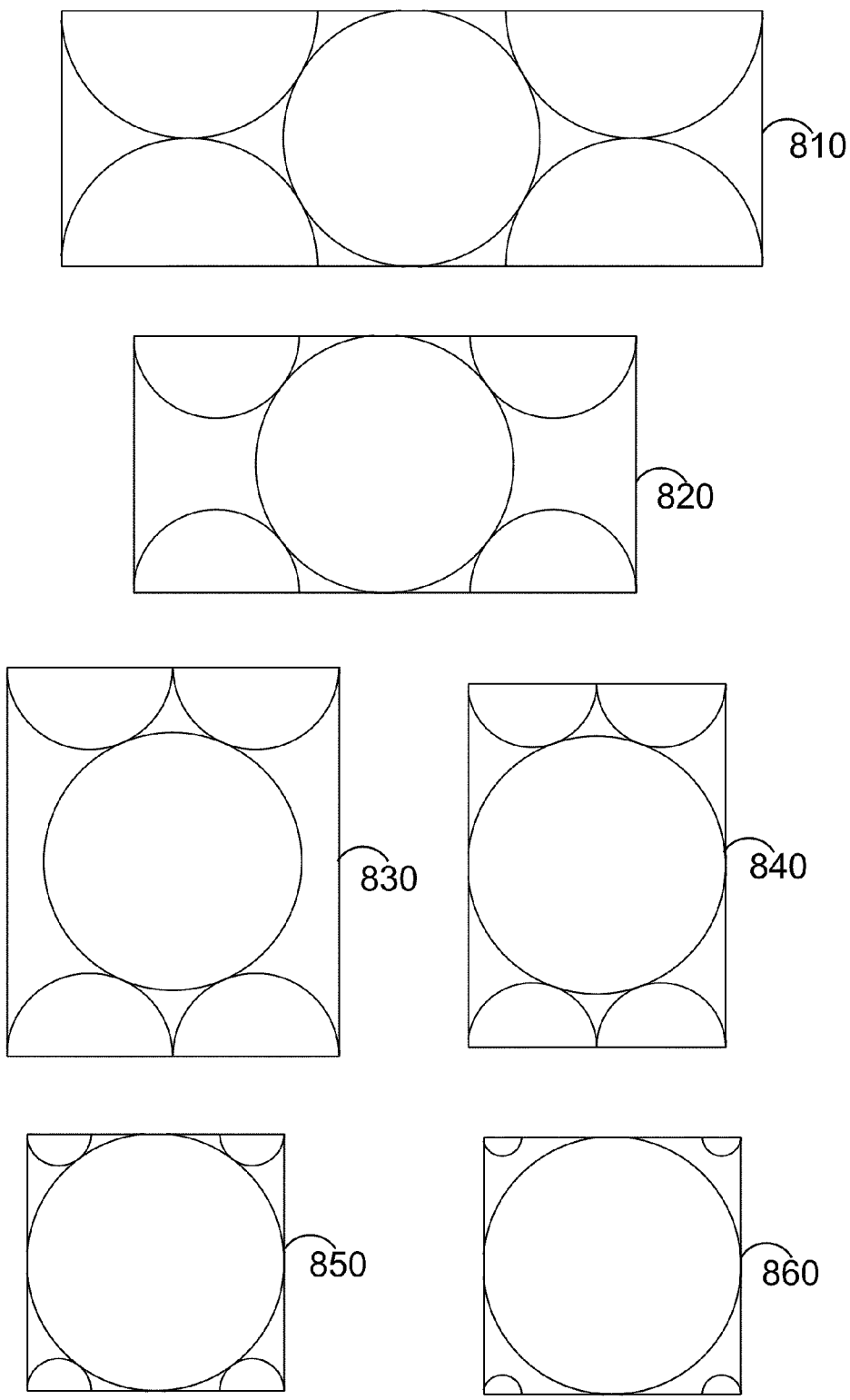
FIG. 8 Illustrates the optimal packing solution for different values of Chrominance Bandwidth Ratio, r.

FIG. 8 illustrates the optimal packing solution in the frequency domain for different values of the Chrominance Bandwidth Ratio r. 810 corresponds to r=1. 820 corresponds to r=0.644. 830 corresponds to a different solution also at r=0.644. 840 corresponds to r=0.5. 850 corresponds to r=0.25. 860 corresponds to r=0.15.

The color pattern of this CFA may have a large period, or not be periodic at all, making it hard to manufacture. In the section, titled "CFA pattern periodicity", we show how to approximate the Tight Packed CFA with another CFA of a sufficiently small period and concomitant decrease in pixel pitch.

The following additional trivial relations exist between the variables:

$$\text{Aspect Ratio} = \frac{d_y}{d_x}$$

$$\text{Pixel area} = d_x \cdot d_y$$

$$\text{Pixels per unit area} = \frac{1}{d_x \cdot d_y}$$

Color Overhead is defined as the ratio of the extra number of pixels required to capture the image in color to the number of pixels required to capture the image in monochrome with the same resolution as luminance. Formally, $$\text{Color Overhead} = \frac{\pi^2}{d_x \cdot d_y \cdot \omega^{*2}} - 1 \qquad (9)$$

Of the nine parameters r, $d_x$, $d_y$, Aspect Ratio, Pixel area, Pixels per unit area, Color Overhead, $\omega^*$ and $w_1$, if any two are given, the remaining seven may be determined from table 1 and the above equations.

The Tight Packed CFA design of table 1 can be used in different imaging system design scenarios to improve one or more of a number of design metrics: pixel count can be minimized to reduce sensor cost or to increase read-out rate or to increase pixel area and thereby the image Signal to Noise Ratio. Image resolution can be increased and crosstalk reduced.

In one exemplary imaging system design scenario, the sensor size and total number of pixels are given. Further, a value of r may be chosen based on its desired trade-off with the luminance relative areal resolution using FIG. 16. Relative areal resolution is defined as $$\frac{\omega^{*2}}{\Omega^2},$$

where $\Omega$ is the Nyquist limit of a square-pixel sensor with the same pixel area as the rectangular pixel sensor being designed. The Tight Packed solution given in table 1 can then be used to determine the remaining CFA parameters, including the OLPF cutoff frequency, $\omega^*$. In this scenario, the luminance resolution is maximized.

In another exemplary imaging system design scenario, the sensor size, the luminance bandwidth $\omega^*$, which is also the OLPF cutoff frequency, are given. Further, a value of r may be chosen based on the desired chrominance resolution, $r\omega^*$. Table 1 can be used to determine the remaining CFA parameters. In this scenario, the number of pixels is minimized, thereby maximizing each pixel's area, and the Signal to Noise Ratio.

In another exemplary imaging system design scenario that is applicable to compact cameras, the sensor size, pixel count and luminance resolution are given. Sensor size is usually standard, pixel count is set to satisfy marketing concerns and luminance resolution is limited by lens quality. Table 1 can be used to determine the remaining CFA parameters. In this scenario r, and hence the chrominance bandwidth, is maximized.

Demosaicking is accomplished by the standard technique of frequency domain demultiplexing. See D. Alleysson, S. Susstrunk, and J. Herault, "Color demosaicing by estimating luminance and opponent chromatic signals in the Fourier domain", in Proc. IS&T/SID 10th Color Imaging Conf, pages 331-336, 2002. Specifically, the two chrominance signals are recovered by multiplication with their respective carriers followed by low pass filtration. Luminance is the baseband signal and can be extracted by one of two standard techniques: low pass filtration of the mosaiced image or subtracting out re-modulated copies of the two chrominance signals from the mosaiced image.

As with all CFA designs, reconstruction quality improvement may be possible by using direction adaptive non-linear methods. The benefits of adaptive directional demosaicking come at a heavy cost, though, since sensing edge directions from noisy sub-sampled images is a hard problem and the non-linear nature of decision making makes noise reduction a non-separable step. Unlike the Bayer CFA, this improvement is expected to be marginal for CFAs of the present invention and so may be dispensed with.

The sensor may be rotated to minimize spectral overlap, if present, or to make its effects less objectionable or both. The sensor may also be rotated to minimize spatial domain crosstalk between adjacent pixels which occurs when light collected by the micro lens of one pixels strikes a neighboring pixel. This optical crosstalk is controlled by aligning the longer side of the rectangular pixel with the longer side of the rectangular sensor.

While sensor elements are rectangular in general, the reconstructed image uses square pixels. An example of this is shown in the code listing of FIGS. 14A-C where sensor and image pixel geometries are different. The reconstructed image may be further modified to be displayed using pixels of any aspect ratio using standard scaling or resizing techniques.

Proof of Optimality

We prove that no CFA design, for a given Chrominance Bandwidth Ratio, r, has fewer photosites than that described in table 1. For convenience, we switch to sensor channels with frequency range from 0 to $2\pi$ along both the x and the y axes.

Lemma 1.

All physically realizable CFAs modulate their luminance signal about $(0, 0)$, $(2\pi, 0)$, $(2\pi, 2\pi)$ and $(0, 2\pi)$.

Proof.

All filters in a physically realizable CFA are non-negative. Furthermore, since non trivial CFAs admit some light of each primary color, the Fourier transform of each primary color has a positive DC component. This, in turn, admits the luminance of the input image as a baseband which is distributed about the 4 aliases of DC, i.e. $\omega^{(1)}=(0, 0)=(2\pi, 0)=(2\pi, 2\pi)=(0, 2\pi)$ Transforming the results of section "Amplitude Modulation in the Discrete Domain" to sensor channels ranging from $[0, 2\pi]$ along x and y axes we find 3 real carrier frequencies that generate a single sideband, namely $(\pi, \pi)$, the aliased pair $(\pi, 0)$, $(\pi, 2\pi)$ and the aliased pair $(0, \pi)$, $(2\pi, \pi)$. All other real carriers generate two sidebands.

Lemma 2.

A CFA that faithfully captures color images with Chrominance Bandwidth Ratio $r \in [0, 1]$, and is constrained to do so by quadrature modulating both chrominance signals with one real carrier frequency that generates two sidebands, has minimal number of photosites if it is designed as per table 2.

TABLE 2

Table for lemma 2. r, $d_x$ and $d_y$ are defined as the Chrominance Bandwidth Ratio, photosite pitch in the x and y directions respectively.

| r | $\omega^{(2)}$ (radians/sample) | $d_x$ (mm) | $d_y$ (mm) |
|---|---|---|---|
| $[0, 0.25]$ | $((1-r)\pi, \pi), ((1+r)\pi, \pi)$ | $\dfrac{\pi}{\omega^*}$ | $\dfrac{\pi}{\omega^*}$ |
| $[0.25, 0.5]$ | $((1-r)\pi, \pi), ((1+r)\pi, \pi)$ | $\dfrac{\pi}{\omega^*}$ | $\dfrac{\pi}{2\sqrt{r}\,\omega^*}$ |
| $[0.5, 0.644]$ | $\left(\dfrac{\pi}{2}, \pi\right), \left(\dfrac{3\pi}{2}, \pi\right)$ | $\dfrac{\pi}{2r\omega^*}$ | $\dfrac{\pi}{\sqrt{(2r+1)}\,\omega^*}$ |
| $[0.644, 1]$ | $\left(\dfrac{\sqrt{(1+r)^2-1}}{\sqrt{(1+r)^2-1}+r}\pi, \pi\right), \left(\dfrac{\sqrt{(1+r)^2-1}+2r}{\sqrt{(1+r)^2-1}+r}\pi, \pi\right)$ | $\dfrac{\pi}{\left(\sqrt{(1+r)^2-1}+r\right)\omega^*}$ | $\dfrac{\pi}{\omega^*}$ |

Proof.

Figure 17:
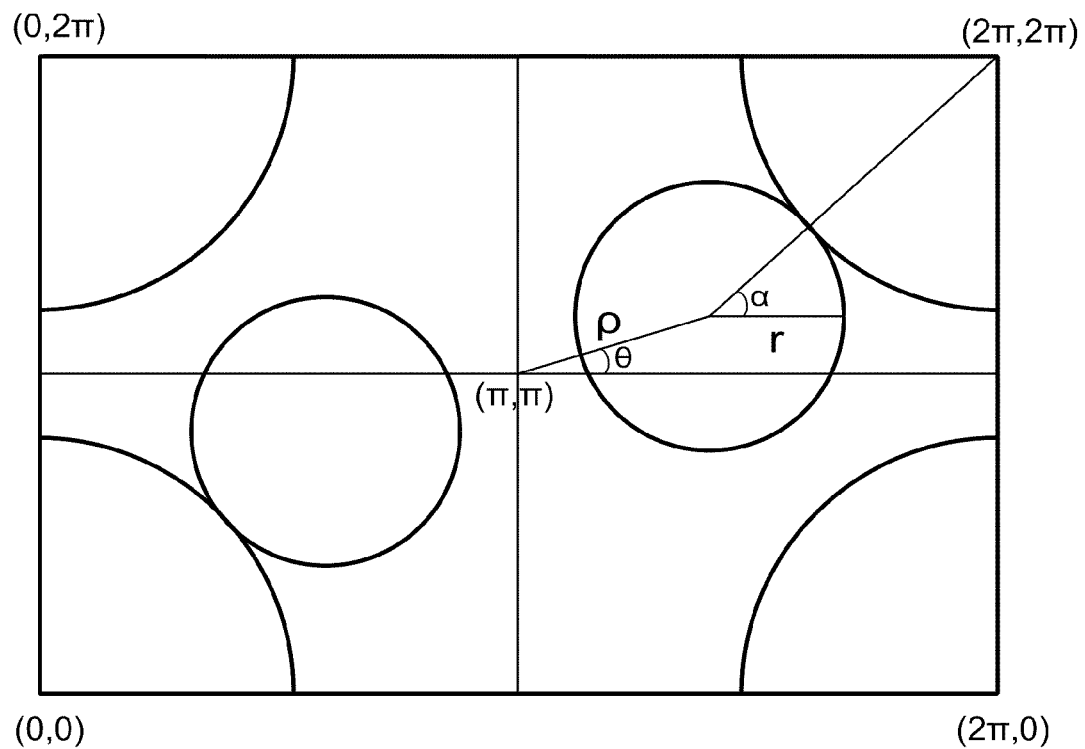
FIG. 17 shows a sensor channel containing a CFA encoded image spectrum with range $[0, 2\pi]$ along both axes for the main proof.

We use the polar representation $(\rho, \theta)$ to denote the conjugate carrier frequency pair $((1-\rho \cos \theta)\pi, (1-\rho \sin \theta)\pi)$, $((1+\rho \cos \theta)\pi, (1+\rho \sin \theta)\pi)$ as shown in FIG. 17. Note that $\rho \geq r$ to prevent chrominance sidebands from overlapping and limit $$0 \leq \theta \leq \frac{\pi}{2}$$

as the remaining values of $\theta$ are symmetrical. Furthermore, denote by $\alpha$ the angle between the x-axis and the line joining the carrier $((1+\rho \cos \theta)\pi, (1+\rho \sin \theta)\pi)$ with $(2\pi, 2\pi)$.

Simple trigonometry gives the height of the sensor channel as $\max(1, \rho \sin \theta + \max(r, (1+r)\sin \alpha))$. Similarly the width of the sensor channel is $\max(1, \rho \cos \theta + \max(r, (1+r)\cos \alpha))$ and the area of the sensor channel is the product height and width. This area is minimized by setting $\rho = r$, $\theta = 0$ for all r, and setting $\alpha$ so as to minimize the width of the sensor channel, or its height, or both, depending on r as described below.

1. $0 \leq r \leq 0.25$: In this case $\alpha$ is chosen so as to minimize both the width and the height of the sensor channel. Pixel pitches do not have to be made finer to capture color, and can be set to the Nyquist rate of luminance.
2. $0.25 < r \leq 0.5$: In this case $\alpha$ is chosen to minimize the width of the sensor channel but not its height. Pixel pitch is made finer than the Nyquist rate of luminance in the vertical direction to accommodate the chrominance sidebands.
3. $0.5 < r \leq 0.644$: As in the previous case $\alpha$ is chosen to minimize the width of the sensor channel but not its height. However pixel pitch is made finer than the Nyquist rate of luminance along both vertical and horizontal directions to accommodate the chrominance sidebands.
4. $0.644 \leq r \leq 1$: In this case $\alpha$ is chosen to minimize the height of the sensor channel. Pixel pitch is made finer than the Nyquist rate of luminance in the horizontal direction to accommodate the chrominance sidebands.

Applying elementary Euclidean geometry to the above cases we get the results of table 2.

Theorem 1.

Given an optical image with luminance bandlimited to $[0, \omega^*]$ radians/mm and chrominance bandlimited to $[0, r\omega^*]$ radians/mm, a CFA with photosite pitch and carrier frequencies specified by table 1 has the lowest photosite count of all CFAs that can pack the luminance and chrominance spectra without overlap.

Proof.

Lemma 2 describes CFAs that use one real carrier with two sidebands to quadrature modulate its two chrominance signals. Clearly any CFA that employs additional carriers—with one or two sidebands—can do no better.

This leaves CFAs that employ carriers with only one sideband. There are 3 such carriers, namely $(\pi, \pi)$, the aliased pair $(\pi, 0)$, $(\pi, 2\pi)$ and the aliased pair $(0, \pi)$, $(2\pi, \pi)$. We need only consider CFA designs that use 2 carriers since adding the third cannot lower photosite count. There are 3 ways to select 2 carriers of which 2 are symmetrical leaving 2 CFA designs to consider. Both these CFAs use the aliased pair $(\pi, 0)$, $(0, 2\pi)$ as one carrier and use either $(\pi, \pi)$, or the aliased pair $(0, \pi)$, $(2\pi, \pi)$ as the other. These 2 CFA designs can easily be analyzed and shown to perform worse than the two sideband solution of lemma 2, for all values of r.

Transforming the results of lemma 2 from a sensor channel 0 to $2\pi$ frequency range to a sensor channel with $-\pi$ to $\pi$ frequency range, we get the results of table 1.

CFA Pattern Periodicity

For some values of the Chrominance Bandwidth Ratio, r, Table 1 requires $\omega_1$ to be set to an irrational fraction of the maximum frequency $\pi$. As a result this simple CFA does not possess a periodic structure, which results in a large number of unique colors, complicating its manufacture. A periodic CFA can be realized by substituting $$\frac{\omega_1}{\pi}$$

with a rational approximation $$\frac{\alpha}{\beta},$$

followed by lowering pixel pitch to prevent crosstalk between the color component spectra. The pitch change depends on if $$\frac{\alpha}{\beta} < \frac{\omega_1}{\pi}$$

or otherwise. The solution when the difference between $$\frac{\omega_1}{\pi} \text{ and } \frac{\alpha}{\beta}$$

is small is given in Table 3.

TABLE 3

Pitch modifications for Periodicity

| r | $\frac{\alpha}{\beta} > \frac{\omega_1}{\pi}$ | $d_x$ (mm) | $d_y$ (mm) | AspectRatio |
|---|---|---|---|---|
| [0.644, 1] | Yes | $\frac{(\beta - \alpha)\pi}{r\beta\omega^*}$ | $\frac{\pi}{\omega^*}$ | $\frac{r\beta}{(\beta - \alpha)}$ |
| [0.644, 1] | No | $\frac{\alpha\pi}{\beta\sqrt{(1+r)^2 - 1}\,\omega^*}$ | $\frac{\pi}{\omega^*}$ | $\frac{\beta\sqrt{(1+r)^2 - 1}}{\alpha}$ |

TABLE 3-continued

Pitch modifications for Periodicity

| r | $\frac{\alpha}{\beta} > \frac{\omega_1}{\pi}$ | $d_x$ (mm) | $d_y$ (mm) | AspectRatio |
|---|---|---|---|---|
| [0.5, 0.644] | Pattern is periodic with a period of 2 × 4 pixels and 4 unique colors | | | |
| [0.25, 0.5] | Yes | $\frac{(\beta-\alpha)\pi}{r\beta\omega^*}$ | $\frac{\pi}{2\sqrt{r}\,\omega^*}$ | $\frac{r\beta}{2\sqrt{r}\,(\beta-\alpha)}$ |
| [0.25, 0.5] | No | $\frac{\pi}{\omega^*}$ | $\frac{\pi}{\sqrt{(1+r)^2 - \left(\frac{\alpha}{\beta}\right)^2}\,\omega^*}$ | $\frac{1}{\sqrt{(1+r)^2 - \left(\frac{\alpha}{\beta}\right)^2}}$ |

Lower pixel counts require sharper rational approximations of $\omega_1$ which, in turn, require CFAs with larger periodicity. This makes the number of pixels and the number of unique colors in the CFA conflicting requirements. The optimal solution trades off the difficulties in manufacturing CFAs with larger number of unique colors with the difficulties in manufacturing sensors with larger numbers of photosites.

Full Chrominance Resolution CFA Patterns

A color stripe CFA, shown in 610 in FIG. 6, with a pixel pitch of $$\frac{\pi}{\omega^*}$$

mm along the vertical axis but $$\frac{\pi}{3\omega^*}$$

mm along the horizontal axis is a popular design to capture luminance and chrominance of equal bandwidth.

A Tight Packed CFA design that similarly captures equal luminance and chrominance bandwidth can be obtained from table 1 by setting r=1. The result is a panchromatic CFA that has $\sqrt{3}+1=2.73$ times as many photosites as a monochrome sensor with the same resolution. This compares favorably to the color stripe CFA that needs 3 times as many photosites. 810 in FIG. 8 shows the sensor channel of this CFA design.

$$\frac{\omega_1}{\pi} = \frac{\sqrt{3}}{\sqrt{3}+1}$$

is not a rational fraction so the CFA pattern is not periodic. However, rational approximations of $$\frac{\omega_1}{\pi},$$

including ⅝, ⁷⁄₁₁ and ²⁶⁄₄₁, can be chosen to arrive at a periodic CFA.

Half Chrominance Resolution CFA Patterns

Many popular consumer image formats encode chrominance at no more than half the bandwidth of luminance. Furthermore, most of the chrominance energy of natural images is compacted in their lower frequencies. A Tight Packed CFA with r=0.5 is a practical design that leverages both these facts.

Figure 10:
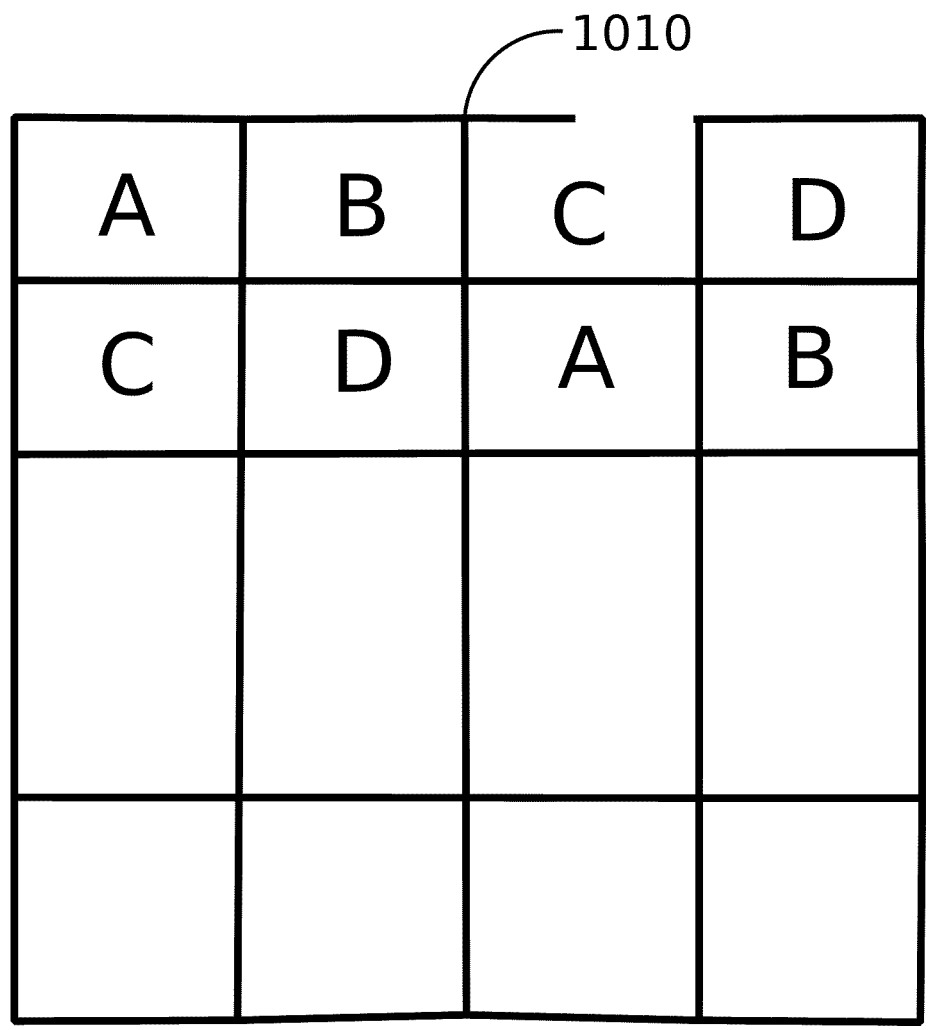
FIG. 10 shows the layout of the optimal half chrominance resolution CFA.

With r=0.5, the Tight Packed CFA has $$d_x = \frac{\pi}{\omega^*}\text{mm},$$

$$d_y = \frac{\pi}{\sqrt{2}\,\omega^*}\text{mm},$$

$$\text{Aspect Ratio} = \frac{1}{\sqrt{2}},\ \omega_1 = \frac{1}{2}\pi$$

radians/sample, and a minimum repeating pattern of 2×4 photosites composed of four distinct colors as shown in FIG. 10.

Exemplary values of the transmissivities of colors A, B, C and D in terms of the Red, Green and Blue primaries are shown in Table 4. They are determined by setting carrier amplitudes a, b and c to roughly maximize chrominance amplitudes and thereby roughly minimize noise amplification, while keeping the Red, Green and Blue transmissivities constrained between 0 and 1.

TABLE 4

Color definitions

| Color | R | G | B |
|---|---|---|---|
| A | 0.75 | 0.75 | 0 |
| B | 1 | 0 | 0.5 |
| C | 0.25 | 0.25 | 1 |
| D | 0 | 1 | 0.5 |

Figure 11:
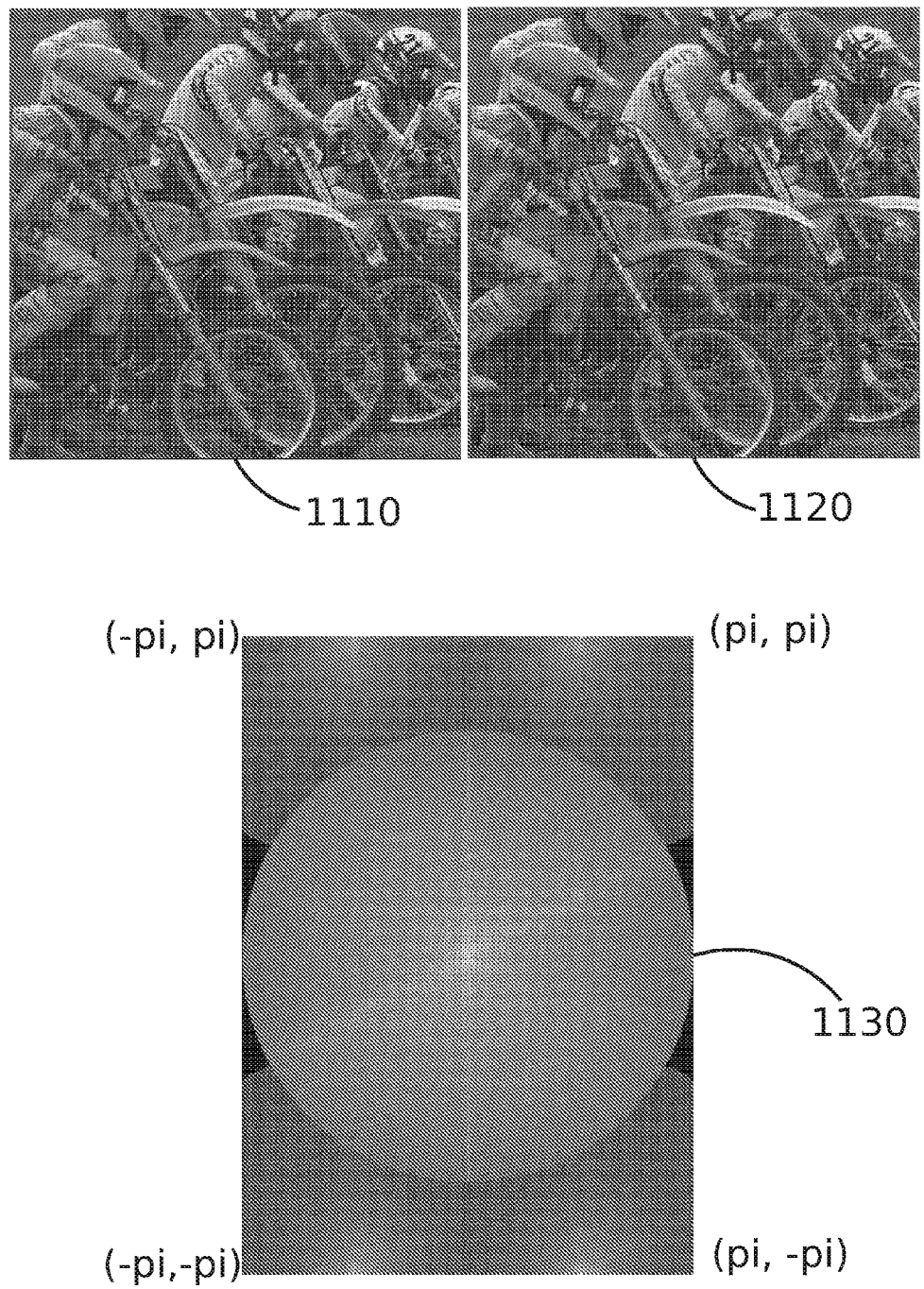
FIG. 11 shows a sample color image and its spectral image after sampling with a CFA that is optimal for half chrominance resolution. It also shows the reconstructed image.

FIG. 11 shows an input color image 1110, shown here in greyscale, and its spectral image 1130 after filtering with the CFA described above. The central circle in 1130 represents the luminance spectrum whereas the peripheral ones represent the chrominance spectra. While crosstalk is not absent, as evidenced by the overlap between the circles, it only occurs where the magnitude of chrominance is low.

Square-Pixel Tight Packing

Square pixels are a sensor industry standard which often makes them significantly cheaper to manufacture than rectangular pixels. For situations where pixels are constrained to be square, we propose the "Tight Packed with Square Pixels" CFA design that takes the form presented below:

$$c_{c1}(n) = a(e^{j(\omega_1 n_1 + \pi n_2)} + e^{-j(\omega_1 n_1 + \pi n_2)})$$

$$c_{c2}(n) = b(e^{j(\omega_1 n_1 + \pi n_2 + \frac{\pi}{2})} + e^{-j(\omega_1 n_1 + \pi n_2 + \frac{\pi}{2})})$$

$$c_l(n) = c$$

where the parameters are given in Table 5 and $j=\sqrt{-1}$. $c_i(n)$, i∈{r, g, b} can be directly computed from the above equations and equations 4, 8.

A Tight Packed with Square pixels CFA modulates two color difference signals with a pair of carriers in quadrature at frequencies ($\pm\omega_1$, $\pm\pi$) radians/sample and

TABLE 5

Tight Packed with Square Pixel CFA design as a function of the Chrominance Bandwidth Ratio, r

| r | $d_x = d_y$ (mm) | $\omega_1$ (rad/sample) |
|---|---|---|
| [0.809, 1] | $\dfrac{\pi}{2r\omega^*}$ | $\dfrac{\pi}{2}$ |
| [0.25, 0.809] | $\dfrac{2\pi}{(r+\sqrt{r^2+4r+2})\omega^*}$ | $\dfrac{-r+\sqrt{r^2+4r+2}}{r+\sqrt{r^2+4r+2}}\pi$ |
| [0, 0.25] | $\dfrac{\pi}{\omega^*}$ | $(1-r)\pi$ | leaves a third color signal, luminance, unmodulated. The parameters have different form in each of three ranges of Chrominance Bandwidth Ratio, r, as presented in table 5.

The choice of amplitudes a, b and c do not affect packing efficiency. Large values of a, b result in strong chrominance signals and thereby low color noise and good color separation. Large value of c results in high transmissivity of the CFA and thereby high sensitivity. Maximizing the chrominance carrier amplitudes a, b and the luminance gain, c, are conflicting objectives and the trade-off depends on the application for which the camera is designed. A low light camera might benefit from a large c while a studio camera—where lighting can be controlled—would do better with large a, b.

Reducing r below 0.25 does not lead to a decrease in photosite count. The CFA design for this range is not unique and one possible design is listed for comparison with other designs.

Figure 9:
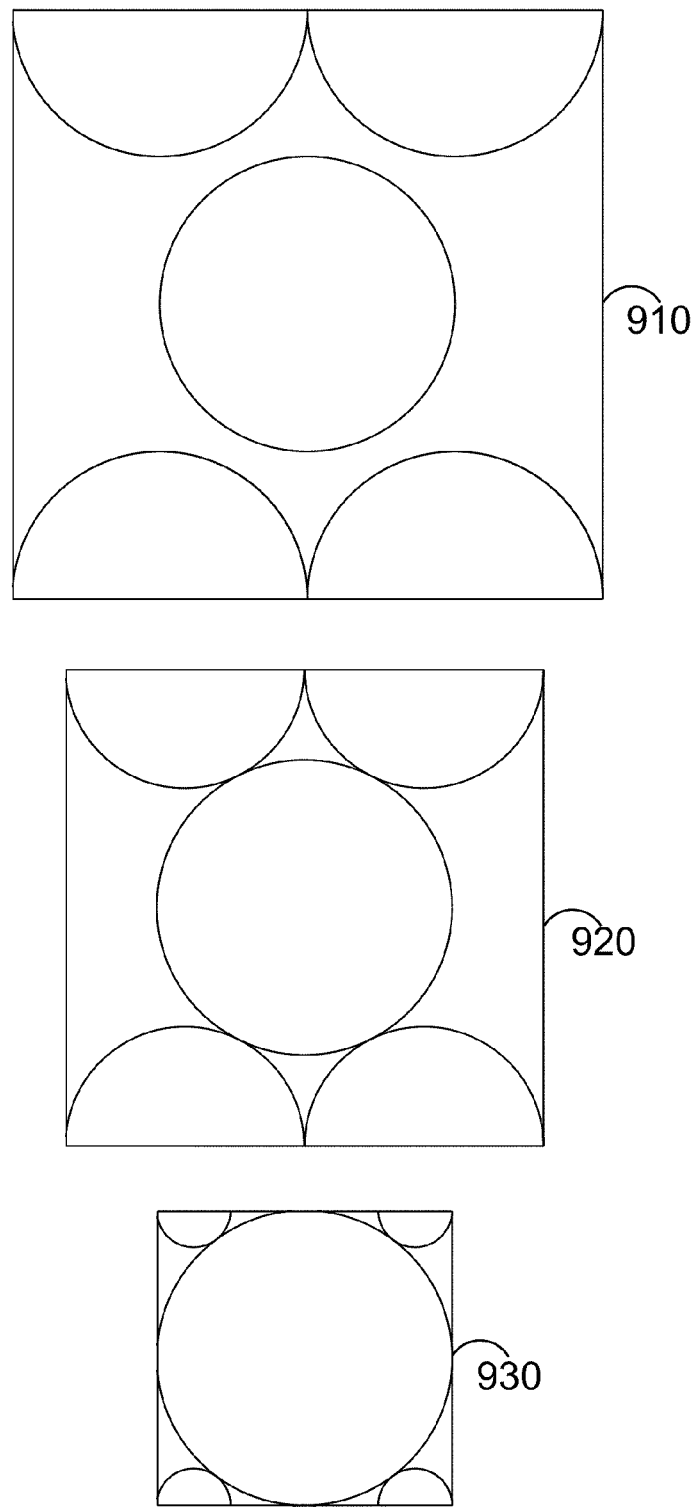
FIG. 9 Illustrates the optimal packing solution restricted to square pixels for different values of Chrominance Bandwidth Ratio, r.

FIG. 9 illustrates the optimal packing solution for different values of r. 910 corresponds to r=1. 920 corresponds to r=0.809. 930 corresponds to r=0.25.

While the optimal square pixel pattern is periodic for r>0.809, it's not for other values of r. As with the Tight Packed rectangular pixel CFA design, these can be made periodic by changing $$\frac{\omega_1}{\pi}$$

to a rational approximation $$\frac{\alpha}{\beta},$$

followed by lowering pixel pitch to prevent crosstalk between the color component spectra.

Generalized Optimal Packing

The present invention can be readily extended to optimally capture images generated by anamorphic lenses or other optical systems that form images with approximately elliptical spectra. If such an optical system captures spatial frequencies up to $\omega^*_1$ along the major axis of the ellipse and $\omega^*_2$ along the minor axis, its Tight Packed CFA can be designed by first designing a Tight Packed CFA for circular spectra of bandwidth $\omega^*_1$ and then scaling the pixel pitch along the minor axis by a factor of $$\frac{\omega^*_1}{\omega^*_2}.$$

The optimal packing solutions presented so far have minimized the pixel count required to faithfully capture a parametrized Chrominance Bandwidth Ratio, r, while assuming the presence of an ideal OLPF. Performance metrics other than r may be preferable especially if the OLPF is significantly non-ideal. With practical OLPFs, luminance and chrominance signals do not have bounded frequency support and as such, crosstalk is unavoidable. It is possible define a measure of crosstalk and minimize it.

In one exemplary framework, luminance and chrominance may be assumed to follow the inverse power law of natural images. See D. L. Ruderman and W. Bialek, "Statistics of natural images: Scaling in the woods", Physics Review Letters 73 (1994), no. 6, 814-817 and Y. Hel-Or, "The canonical correlations of color images and their use for demosaicing", HP Laboratories Israel, Tech. Rep. HPL-2003-164R1, February 2004. PSNR may be used as a measure of a CFA's performance. The OLPF, if used, may be modeled more realistically as a Gaussian diffuser (see M. Kowalczyk, "Spectral and imaging properties of uniform diffusers", J. Opt. Soc. Am. A 1, 192-200 (1984)) or a Birefringent diffuser.

Given an OLPF and a desired performance, an optimal CFA could be found by choosing the carrier frequencies and pixel aspect ratio that minimize the pixel count in the above model. Pixel aspect ratio is an important design parameter controlling sensor efficiency as has been shown explicitly for the Chrominance Bandwidth Ratio model above. CFA design by such means, which tailors the CFA to the OLPF is a novel contribution of the present invention.

Figure 19A:
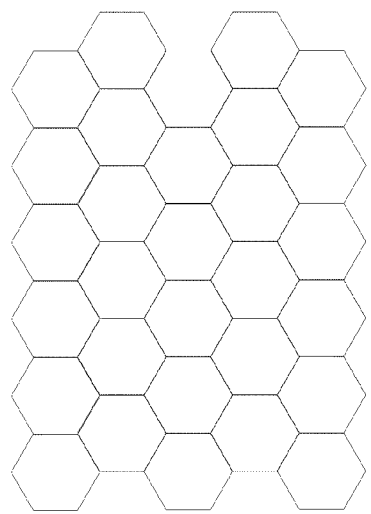
FIG. 19 illustrates the optimization of Hexagonal CFAs.
Figure 19B:
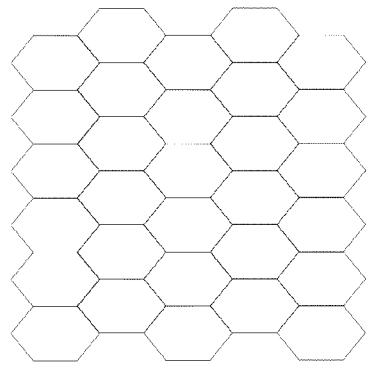
Figure 19C:
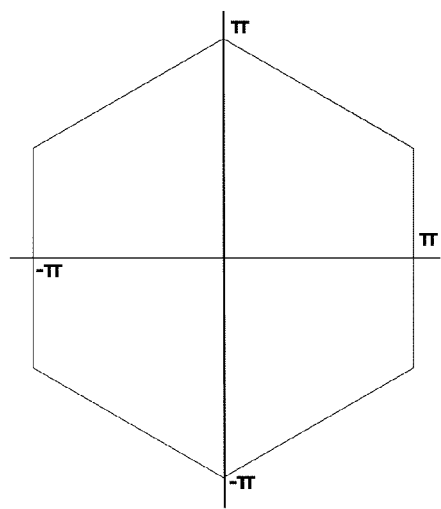
Figure 19D:
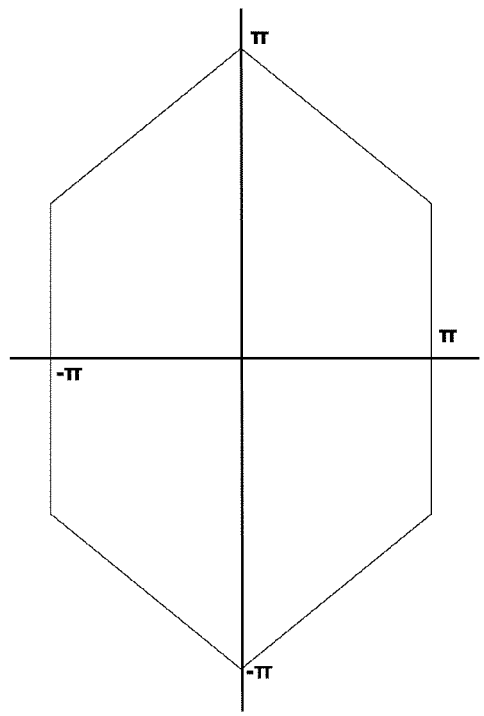

While the preceding detailed optimization addresses square and rectangular sensor lattices, the underlying principle can be applied to all other regular lattices. This can be done by scaling down pixel features along one direction thereby creating frequencies in the sensor channel not occupied by the luminance spectrum in the CFA filtered image spectrum. Chrominance, or other color component signals can be modulated into the sensor channel frequencies thus created. FIG. 19A shows a hexagonal lattice and FIG. 19C its corresponding sensor channel. FIG. 19B shows the hexagonal lattice scaled down along the vertical direction and FIG. 19D shows the corresponding sensor channel which has gotten scaled up in the vertical frequency direction. We refer to this scale change in one direction as a change in aspect ratio. Other pixel shapes may be similarly scaled along one direction to enable optimal packing of Luminance and Chrominance spectra. This includes regular polygons based on the Rhombic and Parallelogrammic lattices. Demosaicking can be accomplished by the standard technique of demodulation of the color component signals followed by an appropriate color transform.

Comparative Performance Analysis

We compare the present invention with prior art, specifically against the popular Bayer pattern as well as against two recent CFAs: pattern A in K. Hirakawa and P. J. Wolfe, "Spatio-spectral color filter array design for enhanced image fidelity", Proc. of IEEE ICIP, pages II: 81-84, 2007 and the 2×3 pattern proposed in L. Condat, "A New Class of Color Filter Arrays with Optimal Sensing Properties".

Performance comparisons of the present invention with prior art are complicated by their dependence on reconstruction technique. As described earlier, various non-linear reconstruction techniques have been developed, particularly for the Bayer CFA. These techniques use extraneous assumptions such as image smoothness to approximately recover a full resolution image. Besides being computationally expensive, these methods also suffer from artifacts caused by violations of the underlying assumptions. Such methods also complicate noise modeling and, by extension, noise reduction.

To eliminate the above considerations from the present comparative analysis, we consider only linear demosaicking schemes that recover only non-overlapping spectra. As previously described, linear demosaicking may be accomplished by the standard technique of frequency domain demultiplexing. We empirically compare the present invention against Bayer with state of the art non-linear demosaickers in the section "Comparative Performance Simulations".

The present theoretical comparison identifies the chrominance resolution each CFA is able to reconstruct accurately. Chrominance resolution is presented as the Chrominance Bandwidth Ratio, r. This comparison is done with the assumption of an ideal OLPF in the imaging optics. The carriers of each CFA is listed in Table 6.

TABLE 6

Carrier Frequencies

| | Bayer | Hirakawa A | Condat | Tight Square | Tight Rect |
|---|---|---|---|---|---|
| Carriers | $(\pi, 0), (0, \pi), (\pi, \pi)$ | $(\pi, \frac{\pi}{2}), (\pi, \pi)$ | $(\pi, \frac{2\pi}{3})$ | $(\omega_1, \pi)$ | $(\omega_1, \pi)$ |

For each CFA design, we compute the Color Overhead as a function of the Chrominance Bandwidth Ratio, r.

Figure 7:
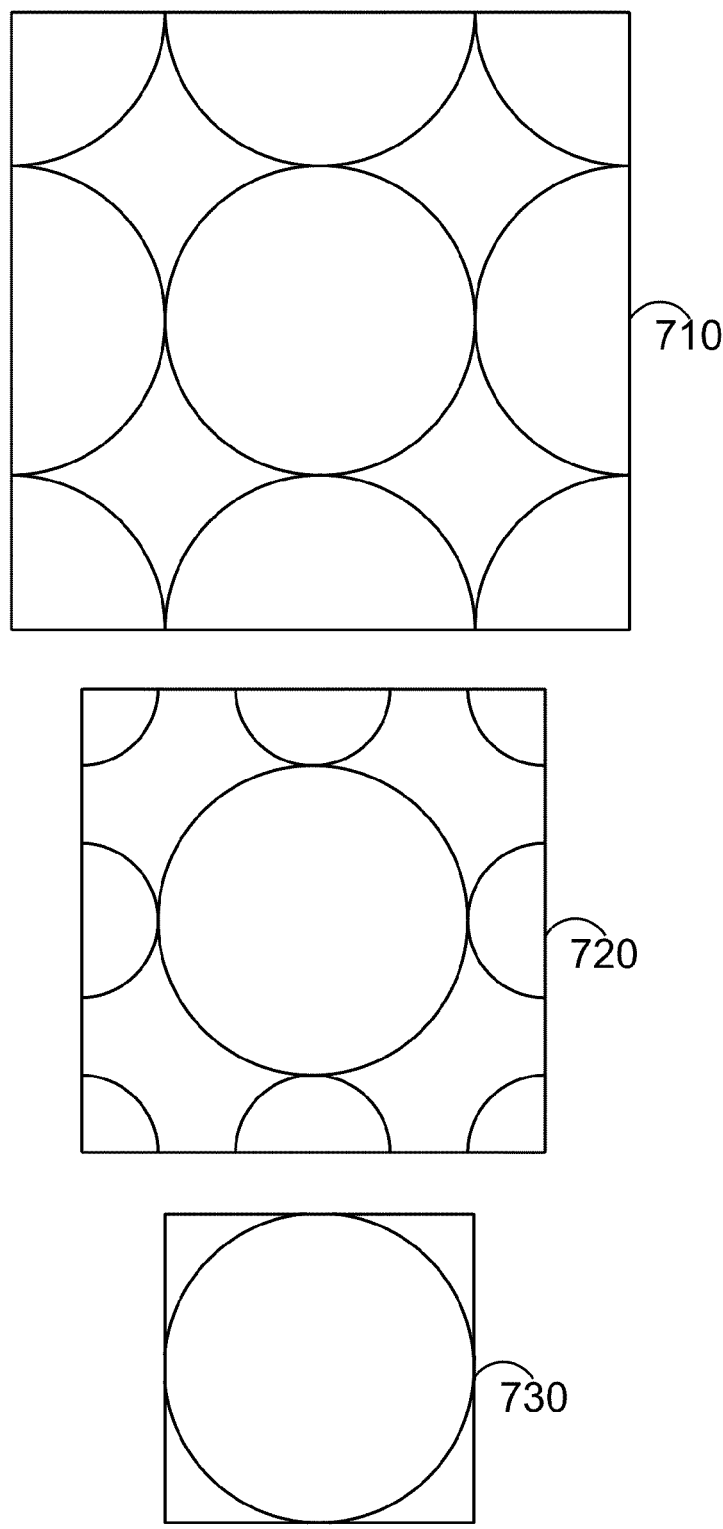
FIG. 7 Illustrates amplitude modulation effected by the Bayer CFA in the frequency domain for different values of Chrominance Bandwidth Ratio, r.

FIG. 7 illustrates color component packing corresponding

TABLE 7

Bayer Color Overhead

| r | Color Overhead |
|---|---|
| [0, 1] | $(1+r)^2 - 1$ | to the Bayer CFA for different values of r. 710 corresponds to r=1. 720 corresponds to r=0.5. 730 corresponds to r=0.

TABLE 8

Hirakawa Pattern A Color Overhead

| r | Color Overhead |
|---|---|
| [0, 0.118] | 0 |
| [0.118, 0.288] | $0.8(1+r)^2 - 1$ |
| [0.288, 1] | $16r^2 - 1$ |

Figure 12:
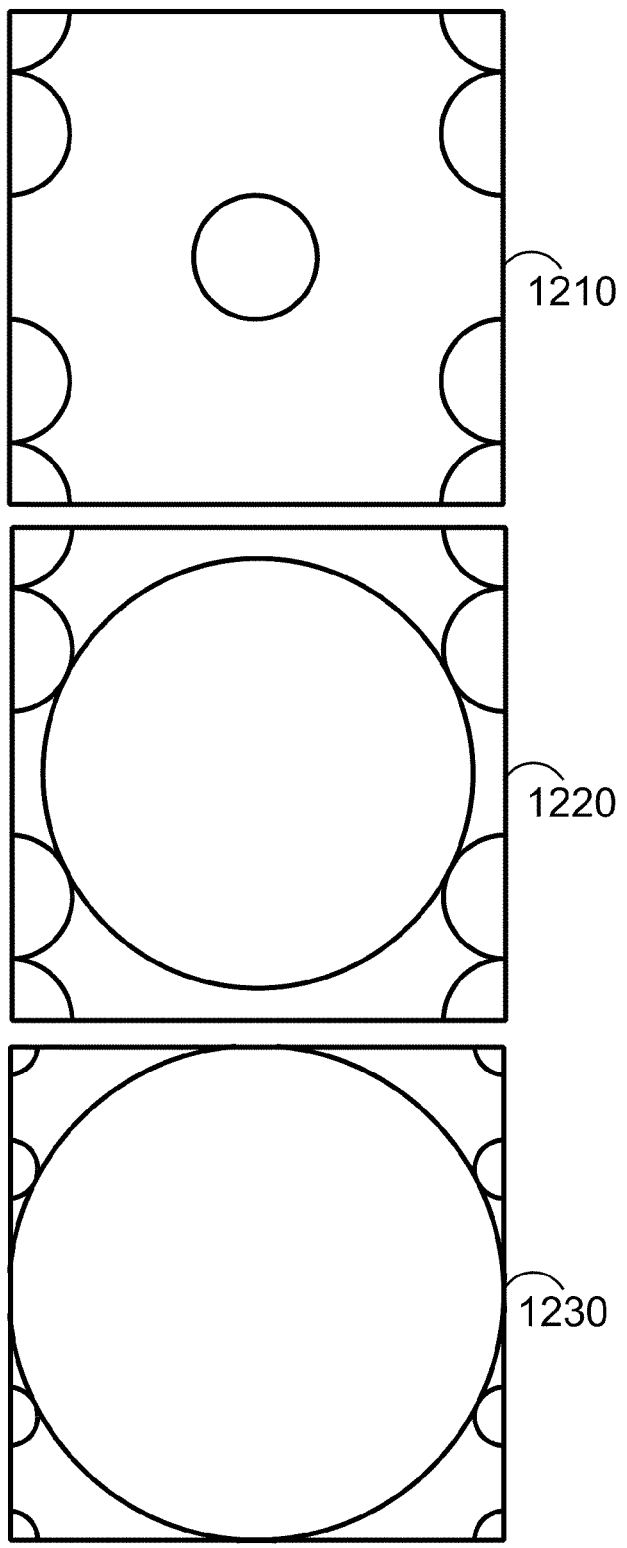
FIG. 12 Illustrates the color packing effected by the Hirakawa pattern A in the frequency domain for different values of Chrominance Bandwidth Ratio, r.

FIG. 12 illustrates color component packing corresponding to the Hirakawa pattern A CFA for different values of r. 1210 corresponds to r=1. 1220 corresponds to r=0.288. 1230 corresponds to r=0.118.

Figure 13:
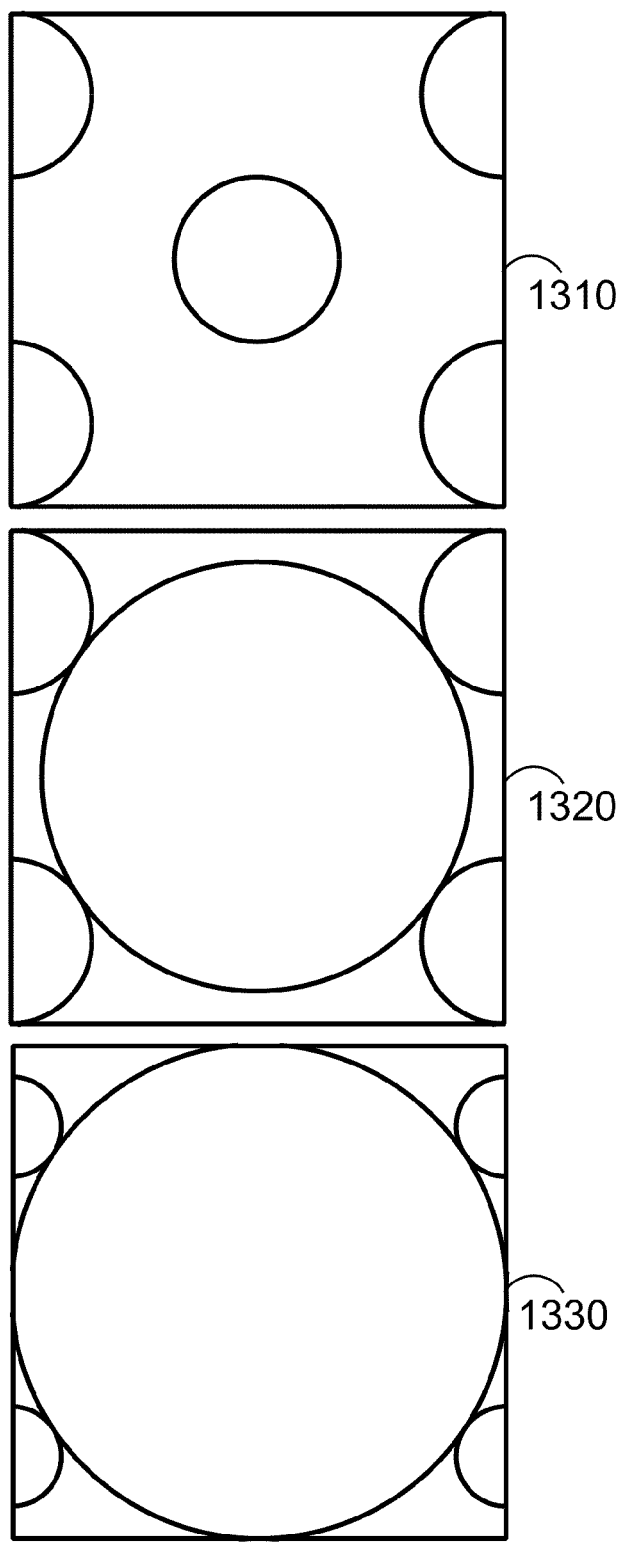
FIG. 13 Illustrates the color packing effected by the Condat pattern in the frequency domain for different values of Chrominance Bandwidth Ratio, r.

FIG. 13 illustrates color component packing corresponding to the Condat CFA for different values of r. 1310 corresponds to r=1. 1320 corresponds to r=0.384. 1330 corresponds to r=0.202.

TABLE 9

Condat's pattern Color Overhead

| r | Color Overhead |
|---|---|
| [0, 0.202] | 0 |
| [0.202, 0.384] | $\frac{9}{13}(1+r)^2 - 1$ |
| [0.384, 1] | $9r^2 - 1$ |

TABLE 10

Color Overhead of the Tight Packed with Square Pixels CFA

| r | Color Overhead |
|---|---|
| [0, 0.25] | 0 |
| [0.25, 1] | $(0.5(r + \sqrt{(r^2 + 4r + 2)}))^2 - 1$ |

TABLE 11

Color Overhead of the Tight Packed (with Rectangular) Pixels CFA

| r | Color Overhead |
|---|---|
| [0, 0.25] | 0 |
| [0.25, 0.5] | $\sqrt{(1+r)^2 - (1-r)^2} - 1$ |
| [0.5, 0.644] | $2r\sqrt{(1+r)^2 - r^2} - 1$ |
| [0.644, 1] | $\sqrt{(1+r)^2 - 1} + r - 1$ |

Figure 15:
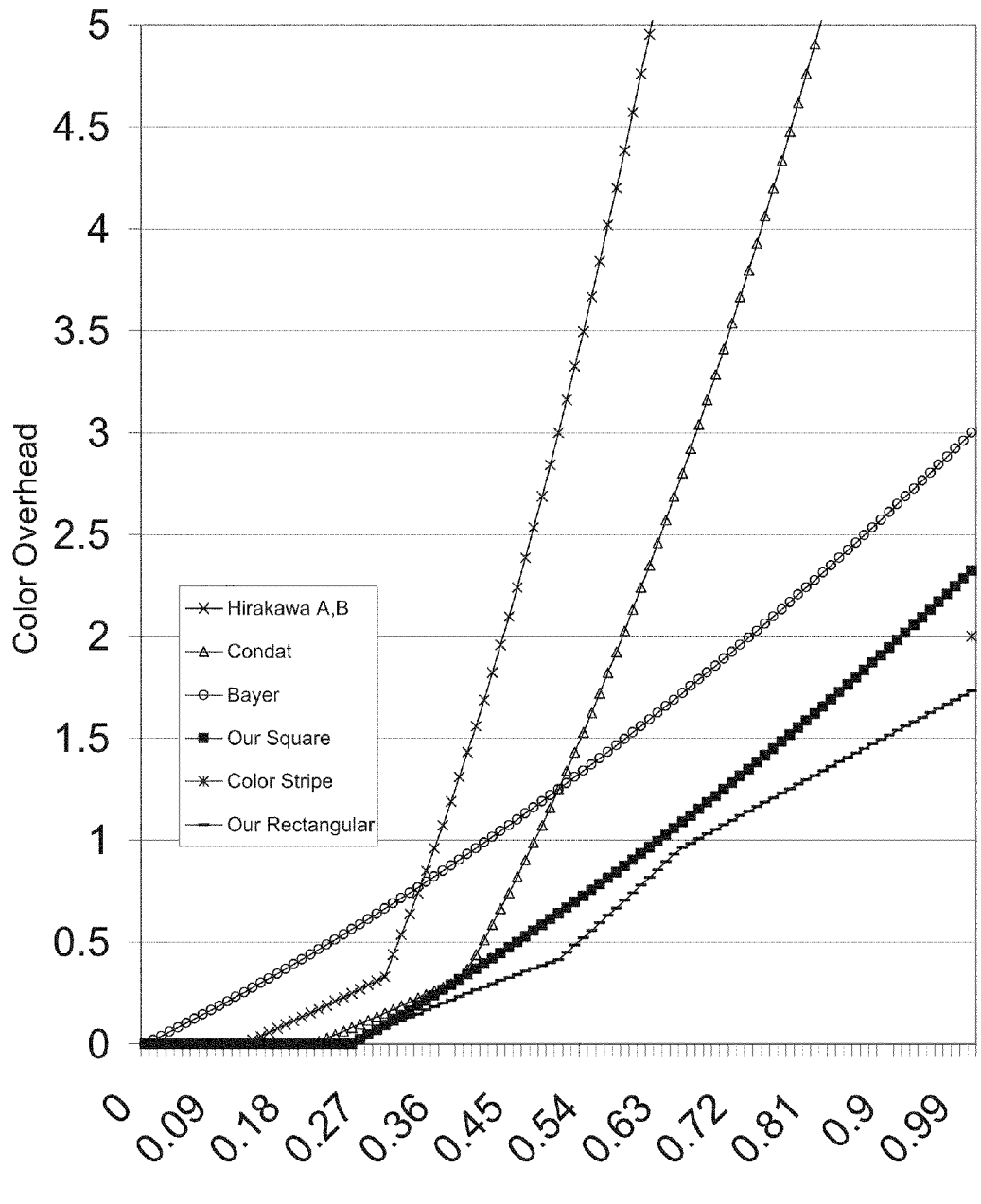
FIG. 15 shows the number of pixels required as a function of the Chrominance Bandwidth Ratio, r, for a number of CFA designs.

FIG. 15 shows the Color Overhead for all the CFAs under comparison. The graph shows that for any desired Chrominance Bandwidth Ratio, r, the Tight Packed CFA with rectangular-pixel requires the fewest pixels, followed by the Tight Packed square pixel CFA. The Hirakawa and Condat CFAs are more efficient than the Bayer CFA for low values of r, but deteriorate rapidly at higher r values, falling behind the Bayer CFA.

Figure 16:
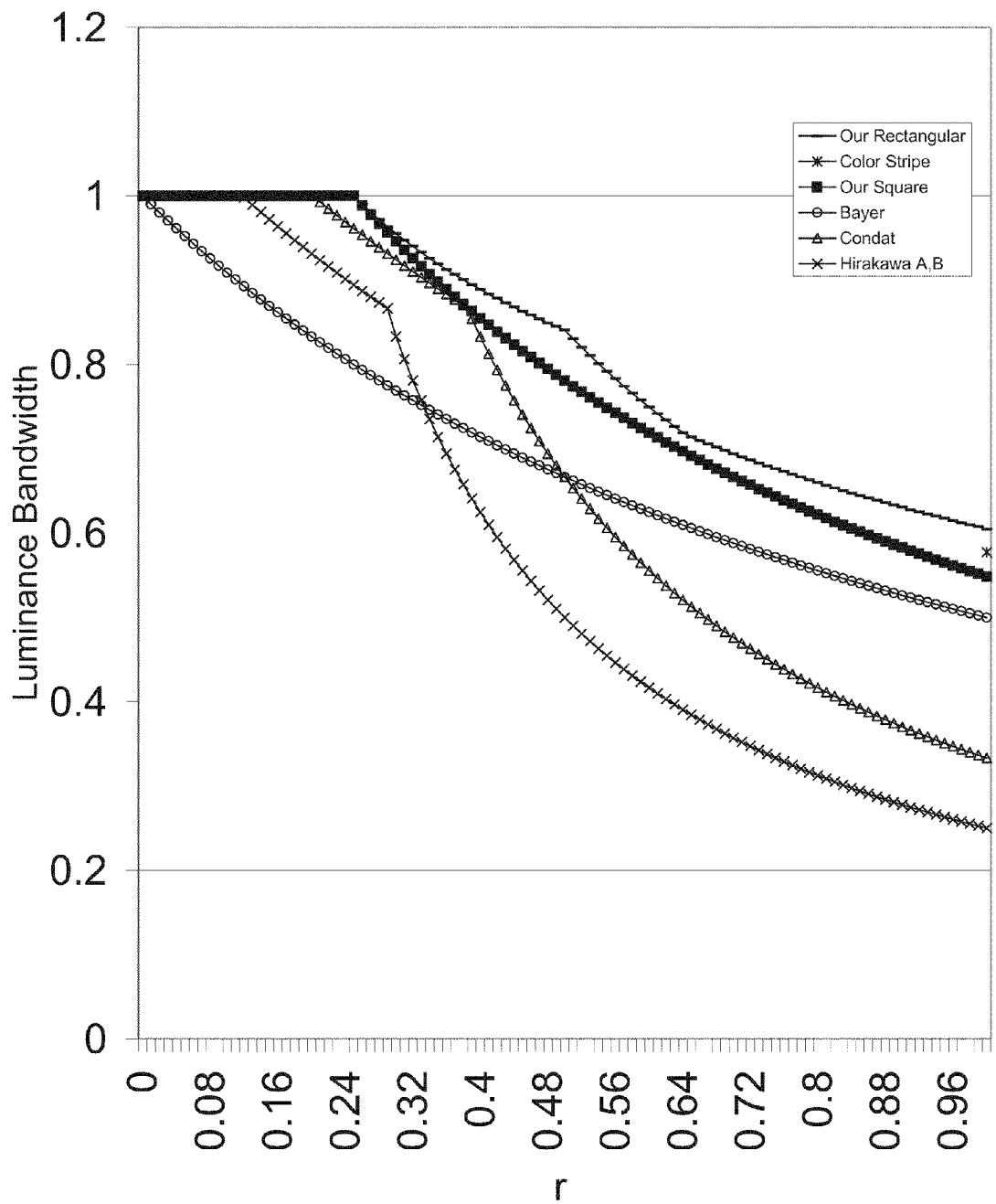
FIG. 16 shows the luminance relative areal resolution as a function of the Chrominance Bandwidth Ratio, r, for a fixed pixel density, for a number of CFA designs.

FIG. 16 presents the same performance information differently. For a fixed number of pixels per unit area, it presents the trade-off relation between luminance relative areal resolution and r for each CFA. Once again the Tight Packed CFA using rectangular pixels is found to give the highest luminance relative areal resolution for any given r. The Tight Packed CFA with square-pixel comes in second. The Condat and Hirakawa CFAs outperform the Bayer CFA only for small values of r.

We shall refer to all CFAs that result in a smaller color overhead than the prior art, as seen from FIG. 15, for a given r, as Improved Packing CFAs.

Comparative Performance Simulations

A CFA pattern with half chrominance resolution as shown in FIG. 10 and in Table 4 was generated.

A Tight Packed CFA pattern with r=0.5, shown in FIG. 10, was compared with the Bayer CFA demosaicked with two state of the art non-linear demosaickers—AHD and POCS—using Matlab simulation. AHD refers to the demosaicker described in Hirakawa, K. and Parks, T., "Adaptive homogeneity-directed demosaicing algorithm," IEEE Transactions on Image Processing 14(3), 360369 (2005) and POCS refers to the demosaicker described in Gunturk, B. K., Member, S., Altunbasak, Y., Member, S., and Mersereau, R. M., "Color plane interpolation using alternating projections," IEEE Trans. Image Processing 11, 9971013 (2002).

An imaging pipeline was simulated consisting of a Gaussian Diffuser OLPF, box filtering due to non-zero pixel size, CFA filtration, demosaicking and post-demosaick sharpening to compensate for the OLPF. The OLPF down samples following the Gaussian low pass filtering to enable simulation of aliasing due to high frequency leakage.

FIG. 11 shows the results of this simulation. 1110 is the original color image, shown here in greyscale. 1130 is the spectrum of the image after being filtered by the CFA. 1120 is the reconstructed color image, shown here in greyscale.

Reconstructed images from were compared with the same input image put through the same optical pipeline except for the mosaicking-demosaicking step. PSNR is used as the comparison metric, and the results are shown in table 12.

FIGS. 14A-C show a snippet of Matlab code used in the simulation. While we do not provide a complete code listing of the simulation, this snippet should be sufficient for anyone of ordinary skill in the art to reproduce our results.

Other Embodiments of the Invention

The present invention may be used for video imaging in addition to still imaging. Besides a trivial extension to multiple frames, algorithms that perform joint

TABLE 12

PSNR measure of image reconstruction quality of the Tight Packed CFA with linear demosaicking, and the Bayer CFA with state-of-art nonlinear AHD and POCS demosaicking.

| Image | Tight Packed | AHD | POCS |
| --- | --- | --- | --- |
| kodim01 | 45.0 | 39.3 | 35.6 |
| kodim02 | 44.2 | 37.7 | 34.2 |
| kodim03 | 44.8 | 37.1 | 32.4 |
| kodim04 | 45.0 | 37.4 | 34.5 |
| kodim05 | 41.8 | 32.2 | 29.8 |
| kodim06 | 46.1 | 39.6 | 37.3 |
| kodim07 | 44.0 | 35.3 | 33.1 |
| kodim08 | 43.7 | 35.3 | 32.8 |
| kodim09 | 45.6 | 37.9 | 34.4 |
| kodim10 | 47.0 | 39.0 | 36.5 |
| kodim11 | 44.6 | 36.7 | 34.1 |
| kodim12 | 46.4 | 38.6 | 35.4 |
| kodim13 | 45.2 | 37.2 | 36.5 |
| kodim14 | 38.5 | 30.1 | 27.3 |
| kodim15 | 44.6 | 38.2 | 35.3 |
| kodim16 | 48.3 | 42.0 | 40.0 |
| kodim17 | 47.0 | 39.6 | 39.0 |
| kodim18 | 44.8 | 36.4 | 34.1 |
| kodim19 | 46.4 | 38.6 | 36.8 |
| kodim20 | 46.6 | 38.2 | 35.5 |
| kodim21 | 45.8 | 37.7 | 35.8 |
| kodim22 | 44.0 | 35.8 | 32.9 |
| kodim23 | 44.9 | 35.8 | 32.3 |
| kodim24 | 45.9 | 38.8 | 36.9 |
| Mean | 45.0 | 37.3 | 34.7 | reconstruction of multiple frames leveraging their correlation may also be used.

Instead of just color images in the visual spectrum, the present invention may also be used for multi-spectral image sensor systems. The present invention allows multi-spectral sampling with smaller sensors requiring smaller apertures without increased acquisition times.

The present invention may be used in image scanners.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

What is claimed:

1. A method of sampling an image comprising:
   projecting an image onto an array of optical transformation devices;
   detecting image intensity values transmitted by said array of optical transformation devices at each sensor element of an image sensor, the image sensor comprising a plurality of photosensitive sensor elements configured to detect a magnitude of incident light, wherein said sensor elements are shaped as regular polygons whose aspect ratio is controlled to minimize sensor element count while obtaining a desired image resolution; and
   processing the detected image intensity values to infer the image.

2. The method of claim 1, wherein the image is inferred by demultiplexing color components determined from said image intensity values using demosaicking techniques.

3. The method of claim 1, wherein multiple images are inferred over a period of time to construct a video sequence.

4. The method of claim 1, further comprising projecting the image through an optical low pass filter prior to projecting the image onto the array of optical transformation devices and wherein the array of optical transformation devices comprises a color filter array.

5. The method of claim 1, wherein said color filter array is chosen according to a tight packing solution which packs a circular frequency support of the image into a minimum area rectangular frequency support of said image sensor, so that sensor element count is minimized while retaining a desired image resolution.

6. The method of claim 5, wherein the color filter array is composed of periodic repetitions of a color pattern.

7. The method of claim 5, wherein said sensor elements are rectangular with an aspect ratio given by said tight packing solution.

8. The method of claim 5, wherein the projected image contains spatial frequencies limited by said tight packing solution.

9. The method of claim 1, wherein a detected chrominance signal has a resolution that is half that of a detected luminance signal.

10. The method of claim 5, wherein said tight packing solution results in a periodic color filter array with a four-by-two minimum repeating pattern with 4 unique colors and a pixel aspect ratio of one divided by the square root of two.

11. The method of claim 1, wherein the elements are selected from the group consisting of: rectangular, hexagonal, and octagonal.

12. A method of sampling an image comprising:
   projecting an image onto a color filter array wherein said color filter array is configured according to a desired resolution for a detected chrominance signal;
   detecting image intensity values transmitted through said color filter array at each sensor element of an image sensor, the image sensor comprising a plurality of photosensitive sensor elements configured to detect a magnitude of incident light; and processing the detected image intensity values to infer the image.

13. The method according to claim 12, wherein said sensor elements are square.

14. The method according to claim 12, wherein said sensor elements are rectangular with aspect ratio controlled to minimize sensor element count while retaining a desired image resolution.

15. An image sampling apparatus comprising:
a color filter array comprising a plurality of color filters, the color filter array being configured such that, in at least one frequency domain representation of at least one image captured using the plurality of photosensitive elements, at least one spectral copy of a chrominance signal is positioned so as to minimize overlap between the chrominance signal and a luminance signal in the at least one frequency domain representation, and wherein the color filters of the color filter array each has a non-square rectangular shape;
an image sensor comprising a plurality of photosensitive sensor elements, each sensor element configured to detect a magnitude of incident light; and
a processor for receiving detected image intensity values.

16. The apparatus of claim 15, wherein the shape of the color filters of the color filter array is selected to maximize a bandwidth of captured image data.

17. The apparatus of claim 15, wherein the color filter array is configured according to a tight packing solution.

18. The apparatus of claim 17, wherein the tight packing solution is used with a chrominance bandwidth ratio of 0.5.

19. The apparatus of claim 15, wherein at least one of the plurality of color filters is panchromatic.

20. A method of sampling at least one image, the method comprising:
filtering electromagnetic radiation using a color filter array comprising a plurality of color filters, the color filter array being configured such that, in at least one frequency domain representation of at least one image captured using the plurality of photosensitive elements, at least one spectral copy of a chrominance signal is positioned so as to minimize overlap between the chrominance signal and a luminance signal in the at least one frequency domain representation, and wherein the color filters of the color filter array each has a non-square rectangular shape; and
detecting the filtered electromagnetic radiation with an image sensor comprising a plurality of photosensitive sensor elements, each sensor element configured to detect a magnitude of incident light; and
processing the detected electromagnetic radiation to infer an image.

21. The method of claim 20, wherein the color filter array is configured according to a tight packing solution.

22. The method of claim 21, wherein the tight packing solution is used with a chrominance bandwidth ratio of 0.5.

23. The method of claim 20, further comprising inferring a plurality of images to construct a video.

* * * * *